US009272667B2

(12) United States Patent
Smith

(10) Patent No.: US 9,272,667 B2
(45) Date of Patent: Mar. 1, 2016

(54) AUTOMATED RETRACTABLE VEHICLE STEP

(71) Applicant: Lund Motion Products, Inc., Buford, GA (US)

(72) Inventor: Anthony Smith, Costa Mesa, CA (US)

(73) Assignee: Lund Motion Products, Inc., Buford, GA (US)

( * ) Notice: Subject to any disclaimer, the term of this patent is extended or adjusted under 35 U.S.C. 154(b) by 0 days.

(21) Appl. No.: 14/169,626

(22) Filed: Jan. 31, 2014

(65) Prior Publication Data

US 2015/0123374 A1 May 7, 2015

Related U.S. Application Data

(60) Provisional application No. 61/898,674, filed on Nov. 1, 2013.

(51) Int. Cl.
*B60R 3/02* (2006.01)
*B60R 16/03* (2006.01)

(52) U.S. Cl.
CPC .. *B60R 3/02* (2013.01); *B60R 16/03* (2013.01)

(58) Field of Classification Search
CPC ............ B60R 3/00; B60R 3/002; B60R 3/02; B60R 16/03
USPC ............................ 280/163, 166, 169; 182/127
See application file for complete search history.

(56) References Cited

U.S. PATENT DOCUMENTS

| 5,697,626 A | * | 12/1997 | McDaniel | ................. B60R 3/02 182/91 |
| 6,112,152 A | | 8/2000 | Tuttle | |
| 6,430,164 B1 | | 8/2002 | Jones et al. | |
| 6,641,158 B2 | | 11/2003 | Leitner | |

(Continued)

FOREIGN PATENT DOCUMENTS

| CN | 201280106 Y | 7/2009 |
| CN | 202758405 U | 2/2013 |

(Continued)

OTHER PUBLICATIONS

Installation Instructions PowerBoard® NX, Bestop, Inc., file metadata accessed through File Properties function of Adobe Acrobat Reader indicates that the document was created and last modified on Oct. 24, 2013.

(Continued)

*Primary Examiner* — John Walters
(74) *Attorney, Agent, or Firm* — Knobbe, Martens, Olson & Bear LLP

(57) ABSTRACT

Powered retractable vehicle step assist systems and methods are provided. The steps systems are configured for installation (e.g., after market installation) and use with a vehicle. The system can include a stepping member movable between a retracted position and a deployed position with respect to the vehicle. The system can further include a vehicle interface configured to electronically communicate with an existing communication bus of the vehicle, such as through a connection with an existing electronics port of the vehicle. A controller of the step system can be configured to process information received from the vehicle interface and, based at least partly on the processing of the information, cause movement of the stepping member between the retracted position and the deployed position.

27 Claims, 11 Drawing Sheets

(56) References Cited

U.S. PATENT DOCUMENTS

| | | | |
|---|---|---|---|
| 6,834,875 B2 | 12/2004 | Leitner et al. | |
| 7,367,574 B2 | 5/2008 | Leitner | |
| 7,413,233 B1 | 8/2008 | Jung | |
| 7,469,916 B2 * | 12/2008 | Watson | B60R 3/02 280/163 |
| 8,157,277 B2 | 4/2012 | Leitner et al. | |
| 8,342,551 B2 * | 1/2013 | Watson | B60R 3/02 280/163 |
| 8,463,953 B2 | 6/2013 | Davis et al. | |
| 8,833,782 B2 * | 9/2014 | Huotari | B60R 3/02 280/163 |
| 2009/0203247 A1 | 8/2009 | Fifelski et al. | |
| 2010/0194070 A1 | 8/2010 | Stauffer et al. | |
| 2012/0098231 A1 | 4/2012 | Huotari et al. | |
| 2012/0139206 A1 | 6/2012 | May | |

FOREIGN PATENT DOCUMENTS

| | | |
|---|---|---|
| CN | 202847566 U | 4/2013 |
| CN | 103149915 A | 6/2013 |
| EP | 1 116 840 A2 | 7/2001 |
| TW | M296187 | 8/2006 |
| TW | M318551 | 9/2007 |
| WO | WO 03/039910 A1 | 5/2003 |
| WO | WO 03/066380 A1 | 8/2003 |

OTHER PUBLICATIONS

Installation Guide Amp Research PowerStep™, Amp Research, Inc., file metadata accessed through File Properties function of Adobe Acrobat Reader indicates that the document was created and last modified on Sep. 18, 2012.

International Search Report and Written Opinion re International Application No. PCT/US2014/062025, mailed Jan. 12, 2015 in 8 pages.

* cited by examiner

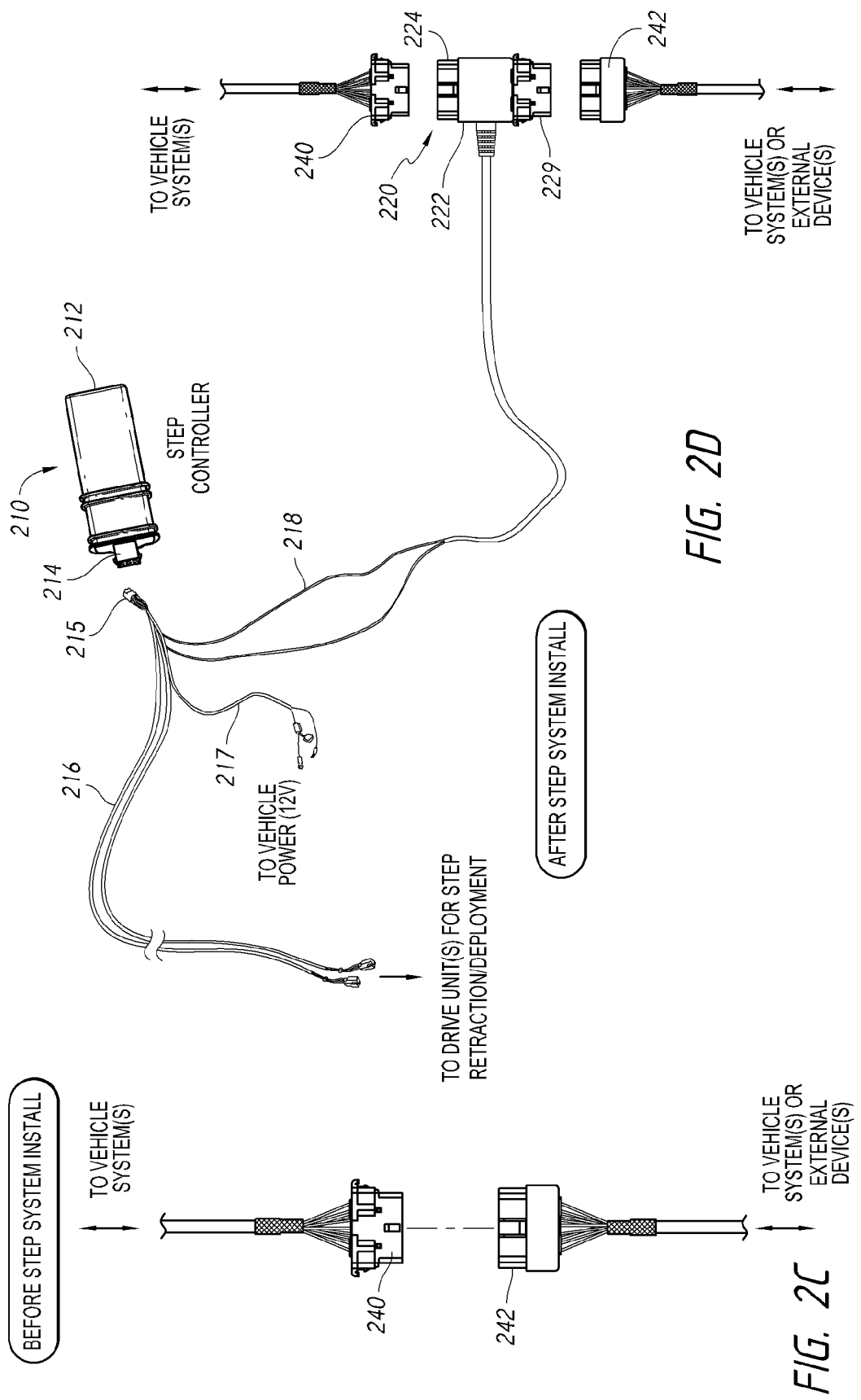

AUTOMATED RETRACTABLE VEHICLE STEP

CROSS-REFERENCE TO RELATED APPLICATION

Any and all priority claims identified in the Application Data Sheet, or any correction thereto, are hereby incorporated by reference under 37 CFR 1.57.

FIELD OF THE DISCLOSURE

The present disclosure relates generally to a stepping assist for motor vehicles. In particular, the disclosure relates to an automated retractable vehicle running board which is movable between a retracted or storage position and an extended, deployed position in which it functions as a step assist into the vehicle.

BACKGROUND OF THE DISCLOSURE

Running boards or similar stepping assists are sometimes added to the side of a motor vehicle, especially to a vehicle with a relatively high ground clearance. While some running boards and other stepping assists are fixed in place, others are movable between retracted and deployed positions. Some retractable vehicle steps are automated, where a powered drive system automatically deploys and retracts the running board, such as when a door on the step-side of the car is opened and closed, respectively. Automated retractable running boards and other step assists are often installed aftermarket, typically by skilled technicians.

SUMMARY

An automated step assist solution is needed that can be installed with reduced complexity and expense. The present disclosure relates to an automated retractable vehicle step system that can be installed in a relatively straightforward and cost effective manner. According to certain aspects, the step system can be installed by the purchaser in a "do it yourself" fashion without hiring out the install to a technician. The system according to some embodiments includes one or more components of the system that plug into, connect with, or otherwise interface with an existing vehicle connection to obtain door status or other information that is generated by existing vehicle electronics.

For example, step system installation can be performed without significant disassembly and/or modification of the doors and/or other parts of the vehicle, e.g., without installation of special in-door componentry, removal of door paneling, etc. Embodiments of the step system interface with and leverage existing vehicle componentry to detect door opening and closing events, or to otherwise identify proper conditions for effectuating automated movement of the step. Thus, some step systems described herein do not include after-market installed componentry on or around the door for detecting triggering conditions used in moving the step.

Additionally, according to certain aspects, installation of the step system desirably does not involve cutting, splicing, or tapping into existing vehicle wiring, such as wiring residing in the vehicle doors or in the immediate vicinity of the doors (e.g., on the door frames or door sills). Rather, the step system in some cases includes a connector that interfaces with existing accessible vehicle connectors or ports to obtain information from the vehicle that is usable in identifying triggering conditions for automated movement of the step (e.g., identifying door openings and closings). The system according to some aspects obtains the information via one or more existing communication buses of the vehicle, e.g., via a digital interface such as a serial data link. Some preferred embodiments plug into or otherwise interface with an on-board diagnostic (OBD) port, for example. The step system according to additional embodiments can interface with ports of existing vehicle computing systems or subsystems such as a body control module (BCM) or another electronic control unit (ECU).

The automated system can additionally include a pass-through function and a replica of the existing vehicle port. This can provide ready access to the existing vehicle port functionality even while the step system is installed and the original port is occupied.

Moreover, step assemblies according to certain aspects primarily or exclusively include wired connections to the existing vehicle and/or amongst components of the step system. For instance, a controller of the step system may connect via a wired connection to existing vehicle electronics to access door opening and closing information or other information sufficient to control step movement. Additionally, in certain embodiments the assembly relies on door opening and closing information that is generated by wired vehicle componentry (e.g., in-door circuitry wired to a mechanical door latch) not incorporating wireless sensors or other componentry, and desirably may convey this information via wires to a step assist control, such as an electronic step assist control module.

According to certain aspects, a powered retractable vehicle step assist system is configured for use with a vehicle. The step assist system can include a stepping member having a stepping surface and movable between a retracted position and a deployed position with respect to the vehicle. At least one support member may be connectable with respect to an underside of the vehicle and connected to the stepping member. The support member can be configured to at least partially support the stepping member with respect to the vehicle. The system can further include a motor operably coupled to the support member and capable of effectuating movement of the stepping member from the retracted position to the deployed position. A vehicle interface of the system can be configured to connect with an already existing electronics port of the vehicle. The vehicle interface can also be configured to electronically receive data via the existing electronics port, where the data generated by existing electronics of the vehicle. The system can also include a controller in electronic communication with the motor. The controller can be configured, in response to the data received from the already existing electronics port, to cause the motor to effectuate movement of the stepping member between the retracted position and the deployed position.

In some embodiments, the vehicle interface implements a serial digital interface, and the existing electronics port provides the data to the vehicle interface as serial digital data. The existing electronics port can be an on-board diagnostic (OBD) port, for example. The existing vehicle electronics can include a body control module (BCM).

The vehicle interface can in some implementations include an electrical connector configured to directly attach to the already existing electronics port of the vehicle. The electrical connector of the vehicle interface may be configured to mate with the already existing electronics port via an interference fit, for instance. The system may include wired connection between the vehicle interface and the controller.

In various implementations, the vehicle interface includes a first connector configured to connect to the existing electronics port and further includes a replica connector. The vehicle interface may be configured to forward the data received from the existing electronics port to the replica connector, for example. The vehicle interface can include a cable spanning between the first connector and the replica connector. The vehicle interface can include a second replica connector, where the controller is coupled to the vehicle interface via connection to the second replica connector, for example. In some embodiments, the first connector and the replica connector are provided on a common housing.

According to certain implementations, the controller commands the motor to effectuate movement of the stepping member between the retracted position and the deployed position in response to determining that a door vehicle has opened.

In some embodiments, the data comprises door opened/closed status information originating from door electronics that does not incorporate any wireless sensors to detect door opened/closed status.

According to additional aspects, a method is provided of controlling movement of a powered, retractable vehicle step supported by an underside of a vehicle. The method can include, with an electronic connector attached to an already existing electronics port of the vehicle, electronically receiving data generated by already existing vehicle electronics. The method can further include processing the data using one or more hardware processors according to a step movement algorithm. Based at least partly on the processing, the method can further include electronically initiating movement of the powered vehicle step between a retracted position and a deployed position. In some configurations, the electronic connector is attached to the existing electronics port via a plug in connection.

According to yet other aspects, a method is provided of controlling an after-market powered vehicle step system installed on a vehicle. The method can include electronically obtaining door status information from a digital communication bus of the vehicle. The method can further include electronically processing the door status information according to an algorithm to determine that movement of a stepping deck of the powered vehicle step is appropriate. Additionally, the method can include commanding a motor of the powered vehicle step which is drivably coupled to the stepping deck to cause movement of the stepping deck between a retracted position and a deployed position.

According to certain embodiments, the step of electronically obtaining can include obtaining the door status information via a pre-existing connector of the vehicle. The method can further include transmitting the door status information to electronic componentry of the step system via a wired connection. In some embodiments, the step of electronically obtaining includes obtaining the door status information via a plug-in connection to the digital communication bus.

The door status information can be generated by pre-existing componentry of the vehicle. In some embodiments, the door status information is generated in response to user actuation of a handle of a door of the vehicle. Moreover, the door status information can be obtained in some embodiments without reliance on disassembly of any portion of any door of the vehicle. The door status information can be provided to the step system via an existing electrical connector of the vehicle without reliance on modification of existing electrical componentry of the vehicle.

According to other aspects of the disclosure, a powered retractable vehicle step assist system is configured for use with a vehicle. The step system can include a stepping member movable between a retracted position and a deployed position with respect to the vehicle. The system can further include a drive unit operably coupled to the support member and capable of effectuating movement of the stepping member from the retracted position to the deployed position. A vehicle interface can be included that is configured to electronically communicate with an electronics port of the vehicle. The system can further include a controller configured to process information received from the vehicle interface and, based at least partly on the processing of the information, to cause movement of the stepping member between the retracted position and the deployed position. The information can be generated by existing vehicle electronics, for example. In some embodiments, the information comprises door status information generated by a car door module of the vehicle.

According to yet another aspect, a method is provided of installing an automated vehicle step assist system to a vehicle. The method can include electrically connecting control electronics of the step assist system to an existing power source of the vehicle. The method can further include mounting the control electronics of the step assist on the vehicle. In addition, the method can include mounting a step of the step assist system with respect to the vehicle such that a stepping deck of the step is capable of powered movement between retracted and deployed positions. The method can further include securing a motor of the step assist system to the vehicle, where the motor in electrical communication with the control electronics and drivably coupled to the step to provide the powered movement of the stepping deck. The method can also include interfacing with an existing communication bus of the vehicle such that electronic information obtained via the existing communication bus is communicated to the control electronics of the step assist system. The step of interfacing can include mating a connector of the step assist system with an existing connector of the vehicle. The method can further include repositioning the existing connector of the vehicle and fastening a replica port of the step assist system to an accessible location in the vehicle.

In some embodiments, the replica port is positioned in substantially the original location of the existing connector of the vehicle. In certain implementations, the interfacing does not involve disassembly of the vehicle. The step of interfacing in some embodiments includes establishing a wired connection between the existing communication bus and the control electronics of the step assist system. The installation can be performed after market, for example.

According to further embodiments, a method is disclosed of providing a powered vehicle step assist configured for use with a vehicle, the method can include providing a stepping member having a stepping surface and movable between a retracted position and a deployed position with respect to the vehicle. The method can further include providing at least one support member connectable with respect to an underside of the vehicle and connected to the stepping member, the support member configured to at least partially support the stepping member with respect to the vehicle. In addition, the method can include providing a motor operably coupled to the support member and capable of effectuating movement of the stepping member from the retracted position to the deployed position. The method can also include providing a connector configured to mate with an already existing electronics port of the vehicle and to electronically receive data via the electronics port, the data generated by existing electronics of the vehicle. The method can in some cases also include providing a controller in electronic communication with the motor. The controller can be, in response to the data received from the already existing electronics port, to cause the motor to effectuate movement of the stepping member between the retracted position and the deployed position.

BRIEF DESCRIPTION OF THE DRAWINGS

FIG. 2C illustrates an existing vehicle port connection prior to installation of an automated step system.

FIG. 2D illustrates portions of an automated step system according to another embodiment, after installation, where the vehicle interface of the step system is interposed in the existing vehicle port connection shown in FIG. 2C.

DETAILED DESCRIPTION

For purposes of summarizing the disclosure, certain aspects, advantages and novel features of the disclosures have been described herein. It is to be understood that not necessarily all such advantages can be achieved in accordance with any particular embodiment of the disclosures disclosed herein. Thus, the disclosures disclosed herein can be embodied or carried out in a manner that achieves or optimizes one advantage or group of advantages as taught herein without necessarily achieving other advantages as can be taught or suggested herein.

The terms "existing", "pre-existing", "pre-installed", "at manufacture", and other similar terms, are used herein to refer to certain vehicle componentry. Such terms can refer to vehicle componentry installed when the vehicle was originally assembled, as opposed to componentry installed aftermarket. These terms can additionally encompass replacement parts, such as installed replacement parts manufactured by the original equipment manufacturer (OEM).

Figure 1A:
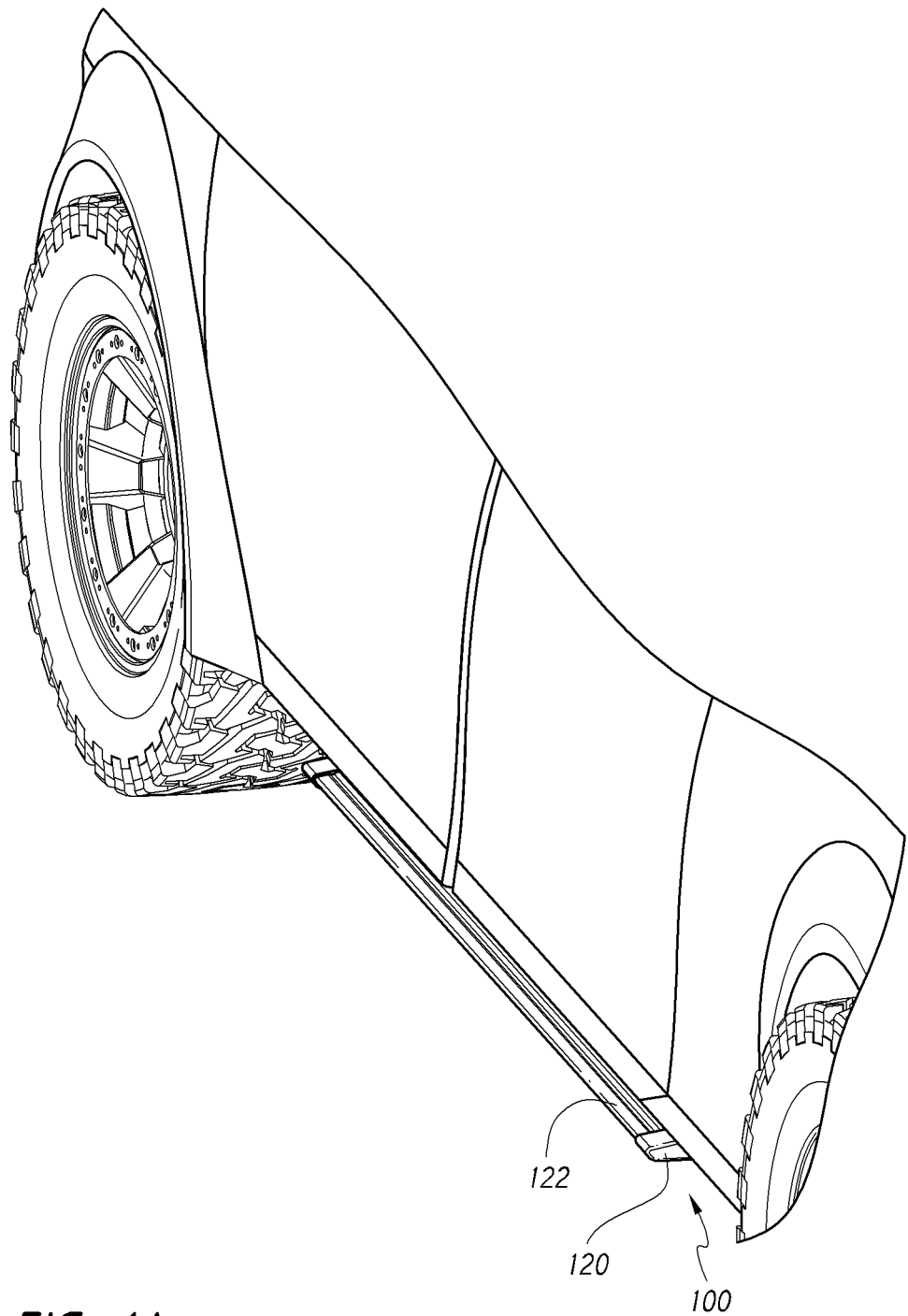
FIGS. 1A-1B illustrate an embodiment of a retractable running board installed on a vehicle, in retracted (FIG. 1A) and deployed (FIG. 1B) positions.
Figure 1B:
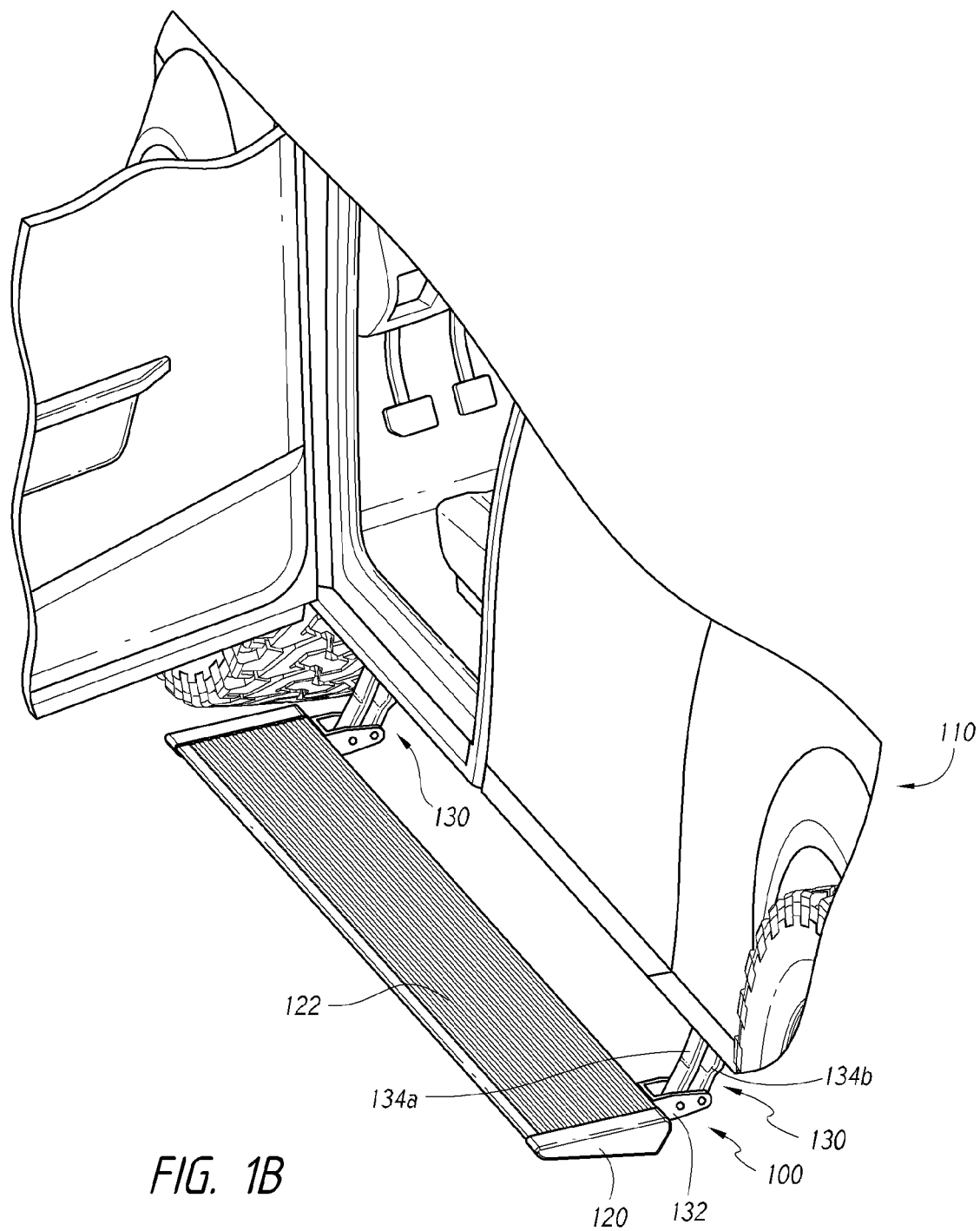

FIGS. 1A-1B illustrate one illustrative example of a retractable running-board step assist 100 attached to an underside of a vehicle 110, in retracted (FIG. 1A) and deployed (FIG. 1B) positions. The step assist 100 can be mounted to any type of motor vehicle suitable for accommodating a step assist, including light duty and heavy duty trucks, sport utility vehicles, vans, sedans, hatchbacks, etc.

The illustrated step assist 100 includes a stepping member or deck 120 having an upper step surface 122. It is readily seen that the stepping deck 120 provides a convenient step assist for a person desiring to enter the vehicle 110 through either of the front and rear vehicle doors.

The exemplary step assist 100 further includes respective support assemblies 130 each of which terminate at a first end attached towards a respective end of the stepping deck 120 and at a second end attached to or otherwise supported by the underside of the vehicle 110. Although a variety of configurations are possible, each support assembly 130 in the illustrated embodiment includes a support bracket 132 attached towards or at an end of the stepping deck 120 and pivotably coupled to a pair of support arms 134a, 134b. The support arms 134a, 134b are in turn mounted to the underside of the vehicle 110, via a rigid mount frame (not shown) or other appropriate mechanism.

As shown, the step assist 100 is provided on one side of the vehicle 110, underneath the front and rear vehicle doors. One or more additional step assists may be provided at other locations such as the other side of the vehicle 110 or on the rear of the vehicle in conjunction with a rear door, hatch, tailgate, etc.

Figure 4:
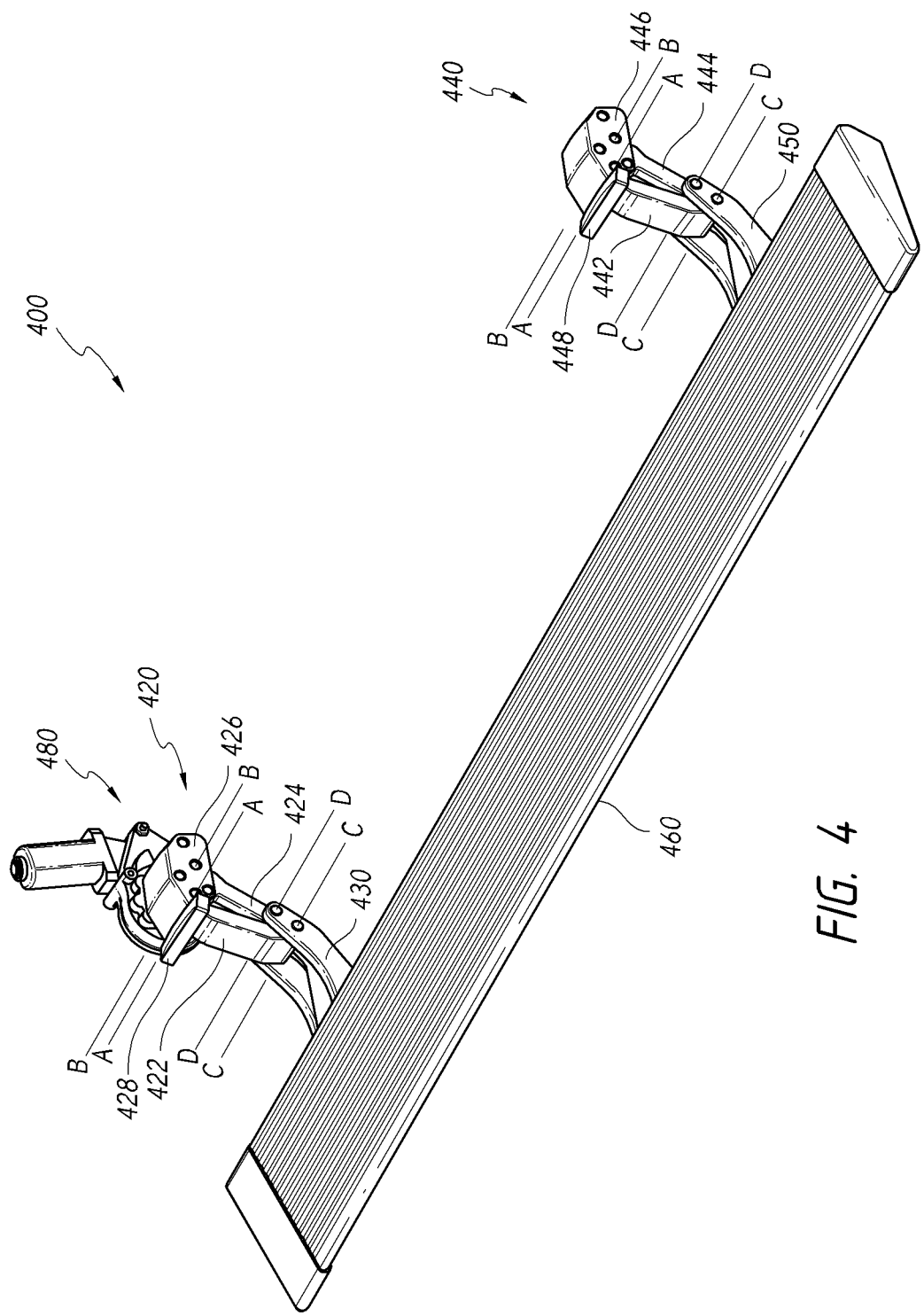
FIG. 4 is a perspective view of one example of a retractable vehicle step.

The step assist 100 shown in FIGS. 1A-1B is merely one illustrative example. Compatible step assists 100 can vary. For instance, the illustrated step assist 100 spans the length of both front and rear doors and can therefore assist passengers with entering and exiting both front and rear doors. In other cases a shorter stepping deck 120 is provided, which may span the length of only a single door or a portion thereof. Another more detailed example of a step assist that can be incorporated into any of the step systems described herein is shown in FIG. 4, described below. Further examples of compatible step assists are described throughout the disclosure, as well as in U.S. Pat. No. 8,157,277, titled "Retractable Vehicle Step", issued on Apr. 17, 2012, and U.S. Pat. No. 7,367,574, titled "Drive Systems for Retractable Vehicle Step", issued on May 6, 2008, the entire disclosures of which are incorporated by reference herein.

The step assist 100 is configured for automated, powered retraction and deployment. For instance, the step assist 100 can form part of an automated step system including a drive unit that includes a motor drivably coupled to the step assist 100, e.g., via one or more of the support arms 134a, 134b, for powered retraction and deployment of the stepping deck 120.

Figure 2A:
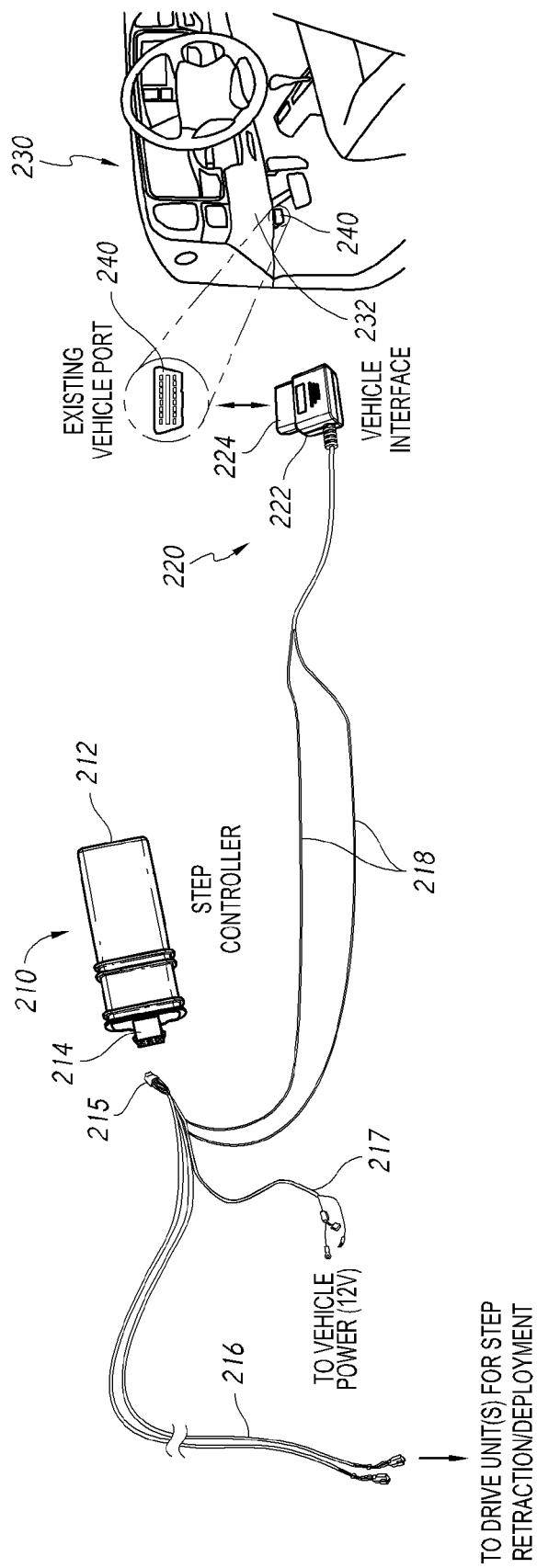
FIG. 2A illustrates portions of an automated step system including a vehicle interface that cooperates with an existing vehicle port, according to an embodiment.

The automated step system can further include a controller (not shown) that instructs the motor to effectuate movement of the step assist 100. The controller can be in communication with existing vehicle systems via a vehicle interface of the step system. FIG. 2A illustrates a controller 210 and vehicle interface 220 of an embodiment of an automated step system configured for use with a vehicle 230. While only the controller 210 and vehicle interface 220 of the step system are shown for illustrative purposes, it is to be understood that embodiments of the step system, including the illustrated embodiment, include additional componentry such as a drive assembly, stepping deck, etc., such as is shown and described herein, e.g., with respect to FIGS. 3 and 4.

As indicated, the illustrated controller 210 includes a housing 212 having at least one connector 214 configured to mate with at least one corresponding connector 215, thereby connecting the controller 210 with wiring 216, 217, 218 of the step system. For instance, the illustrated controller 210 is in communication with a motor and/or other components of a drive unit of the step system via the wiring 216, receives power via the wiring 217, and is in communication with the vehicle interface 220 via the wiring 218. In some configurations, the wiring 217 is connected to an existing vehicle battery, thereby delivering power to the automated vehicle step system without necessitating a separate power supply. In alternative embodiments, the step system connects to the vehicle battery indirectly, such as through a power socket located in the vehicle interior, or includes a separate power supply.

The controller 210 includes control electronics (not shown) which, in the illustrated embodiment reside within the housing 212. For example, the control electronics can include one or more hardware processors comprising digital logic circuitry (e.g., one or more microcontrollers executing software and/or firmware), computer memory, and other appropriate circuitry. The control electronics is generally configured to process data received from the vehicle interface 220 and issue commands to the drive assembly of the step system to control powered movement of the step assist.

The vehicle interface 220 includes a connector module 222 having a port 224 that is configured for mechanical and electrical cooperation with an existing port 240 of the vehicle 230. In the illustrated embodiment, the port 224 implements a friction fit with the existing vehicle port 240, although a variety of other mating mechanisms are possible instead of, or in combination with a friction fit, including latch, interference, or snap-fit mechanisms, mechanisms including fastening screws, and the like. While the illustrated connector module 222 attaches directly to the existing vehicle port 240, in some alternative configurations an adaptor or other component (e.g., an after-market adaptor) may be attached to and interposed between the existing vehicle port 240 and the vehicle interface 220.

The existing vehicle port 240 is in communication with one or more existing electronic systems of the vehicle 230, and provides vehicle status information. The vehicle interface 220 of the step system receives this information via the electrical connection between its port 224 and the existing vehicle port 240. As is described further, the status information of certain embodiments (including the illustrated embodiment) includes, without limitation, information relating to the status of one or more doors of the vehicle 230, usable in identifying conditions for deploying/retracting the stepping member.

The step system in some embodiments such as those of FIGS. 2A-2F obtains information over an existing electrical communication bus of the vehicle that is usable to determine when to move the step. For instance, the step system obtains information over a digital communications bus such as a serial communications link. Such communications buses can be provided over the existing vehicle port 240, such as a serial digital interface provided on an OBD-II port.

Installation of embodiments of the step system such as those of FIGS. 2A-2F desirably rely on accessible vehicle communication ports without cutting, splicing, or tapping into existing vehicle wiring, such as wiring residing in or around the vehicle doors, or elsewhere in the vehicle. Rather, such step systems leverage entirely or substantially entirely existing componentry (e.g., manufacturer installed or OEM componentry) to obtain door opening or closing information via an existing communication bus of the vehicle.

In addition, the step systems of certain embodiments including the ones depicted in FIGS. 2A-2F incorporate wired as opposed to wireless connections, e.g., between the drive assembly and the controller 210 via the wiring 216, between the vehicle interface 220 and the controller 210 via the wiring 218, and/or between the vehicle interface 220 and the existing vehicle port 240. This can significantly simplify the design, increasing operational robustness and reducing costs. For instance, wireless systems can be costly and in some cases are susceptible to interfere with or be subject to interference from other wireless signals in the proximity of the vehicle. In some alternative embodiments, one or more of the above-listed connections incorporate a wireless interface.

Moreover, step systems such as those depicted in FIGS. 2A-2F obtain door opening and closing information (or for otherwise determining when to move the step) via an accessible communication bus of the vehicle while relying solely or primarily on existing, pre-installed componentry to provide the information over the bus. For instance, installation of the embodiments of FIGS. 2A-2F do not involve installation of after-market componentry in the vehicle doors, in the immediate vicinity thereof (e.g., the door sills and door frame), or otherwise. Instead, the existing vehicle port 240 provides such information. This can be especially beneficial in contrast to solutions that rely on after-market installation of sensing componentry on the door or in the vicinity of the door to detect door opening and closing events. This is at least partly because such systems can include costly and complex componentry that can become dislodged or damaged due to the forces associated with repeated door opening and closing, particularly over long periods of time. In contrast, manufacturer installed and OEM parts (e.g., existing door latches and associated electronics) typically undergo extensive quality control measures under highly regulated conditions, and are also integrated into the original vehicle design. Such components are therefore more likely to withstand such wear and tear over time. Nonetheless, in some alternative embodiments, the step system can incorporate some amount of after-market componentry for detecting door opening/closing events.

In one embodiment, the vehicle interface 220 includes processing electronics (not shown) configured to process the information received from the existing vehicle port 240. The processing electronics can reside within the housing of the connector module 222 and can include one or more hardware processors comprising digital logic circuitry (e.g., one or more microcontrollers executing software and/or firmware), memory, and other appropriate circuitry. The processing module can further include circuitry configured to condition the received signals for delivery to the step controller 210 via the wiring. In some embodiments, the processing module converts the information received from the existing vehicle port 240 into a protocol or format that is understandable by the controller 210. In one embodiment, the processing electronics converts information received from the existing vehicle port 240 from a first format (e.g., an OBD-II compliant serial format) into a second format (e.g., an RS232 serial interface). The processing electronics can in some cases perform additional data processing. For instance, the processing electronics may identify information relevant to operation of the automated step system (e.g., information relating to the operation and status of the vehicle doors) for delivery to the controller 210, while filtering out other data not relevant to step system operation (e.g., certain engine status information or the like). For example, the vehicle interface 220 can process the information received over the vehicle port 240 and provide outputs to the controller 210 indicate the state of the drivers and/or passenger side doors. In yet other configurations, the connector module 222 forwards the received information to the controller 210 without manipulating the received information. In such cases, the control electronics of the controller 210 may implement some or all of the functionality described with respect to the processing electronics of the vehicle interface 220.

The illustrated example shows the existing vehicle port 240 located under the dashboard 232 above the passenger side foot well of the vehicle 230, although a variety of other locations are possible. For instance, depending on the embodiment, the existing vehicle port 240 may be positioned anywhere on the interior or exterior of the vehicle, including, without limitation, in the glove compartment, on the dashboard, in the engine compartment under the hood, in the trunk, on the underside of the vehicle 230, or somewhere on or in the center console between the driver and passenger seats. In certain embodiments, the existing vehicle port 240 is positioned at a location such that it is accessible for connection thereto without removing or disassembly existing parts of the vehicle 230.

The existing vehicle port 240 can generally comprise any pre-existing (e.g., factory installed) port that provides access to the existing electronics systems of the vehicle 230. For instance, the existing vehicle port 240 in the illustrated and other embodiments can be an on-board diagnostic (OBD) port. Depending on the embodiment, the existing vehicle port 240 can be compliant with any appropriate OBD standard, including without limitation the following: ALDL, OBD-I, OBD-1.5, OBD-II, European On-board Diagnostics (EOBD), EOBD2, Japan On-board Diagnostics (JOBD), and Australian OBD standards (e.g., ADR 79/01 and 79/02). The existing vehicle port 240 can be compliant with the OBD-II standard mandated by the federal Clean Air Act Amendments of 1990, for example. Where the existing port 240 is an OBD-II port, it may further provide data in a manner that is compliant with one or more of the serial data protocols defined in the SAE J1850 standards document, such as the SAE J1850 pulse-width modulation (PWM) and SAE J1850 VPW (variable pulse width) protocols. In some cases, the existing vehicle port 240 complies with the SAE J1962 standards document defining the physical connector for the OBD-II interface, and which specifies the 16-pin arrangement set forth in the table provided below.

| Pin | Signal Description |
| --- | --- |
| 1 | Manufacturer discretion. GM: J2411 GMLAN/SWC/Single-Wire CAN. VW/Audi: Switched +12 to tell a scan tool whether the ignition is on. |
| 2 | Bus positive Line of SAE-J1850 PWM and SAE-1850 VPW |
| 3 | Ford DCL(+) Argentina, Brazil (pre OBD-II) 1997-2000, USA, Europe, etc. Chrysler CCD Bus(+) |
| 4 | Chassis ground |
| 5 | Signal ground |
| 6 | CAN high (ISO 15765-4 and SAE-J2284) |
| 7 | K line of ISO 9141-2 and ISO 14230-4 |
| 8 | Manufacturer discretion. Many BMWs: A second K-Line for non OBD-II (Body/Chassis/Infotainment) systems. |
| 9 | Manufacturer discretion. GM: 8192 baud ALDL where fitted. |
| 10 | Bus negative Line of SAE-J1850 PWM only (not SAE-1850 VPW) |
| 11 | Ford DCL(-) Argentina, Brazil (pre OBD-II) 1997-2000, USA, Europe, etc. Chrysler CCD Bus(-) |
| 12 | — |
| 13 | Manufacturer discretion Ford: FEPS - Programming PCM voltage |
| 14 | CAN low (ISO 15765-4 and SAE-J2284) |
| 15 | L line of ISO 9141-2 and ISO 14230-4 |
| 16 | Battery voltage |

In various embodiments, the vehicle interface 220 can be configured to cooperate with a variety of other types of existing vehicle ports 240 other than OBD ports, such as a port of a body control module (BCM) or other electronic control unit (ECU) of the vehicle 230. Further details regarding compatible existing vehicle ports and the types of information received from the existing vehicle port are provided herein, with respect to FIG. 3, for example.

Figure 2B:
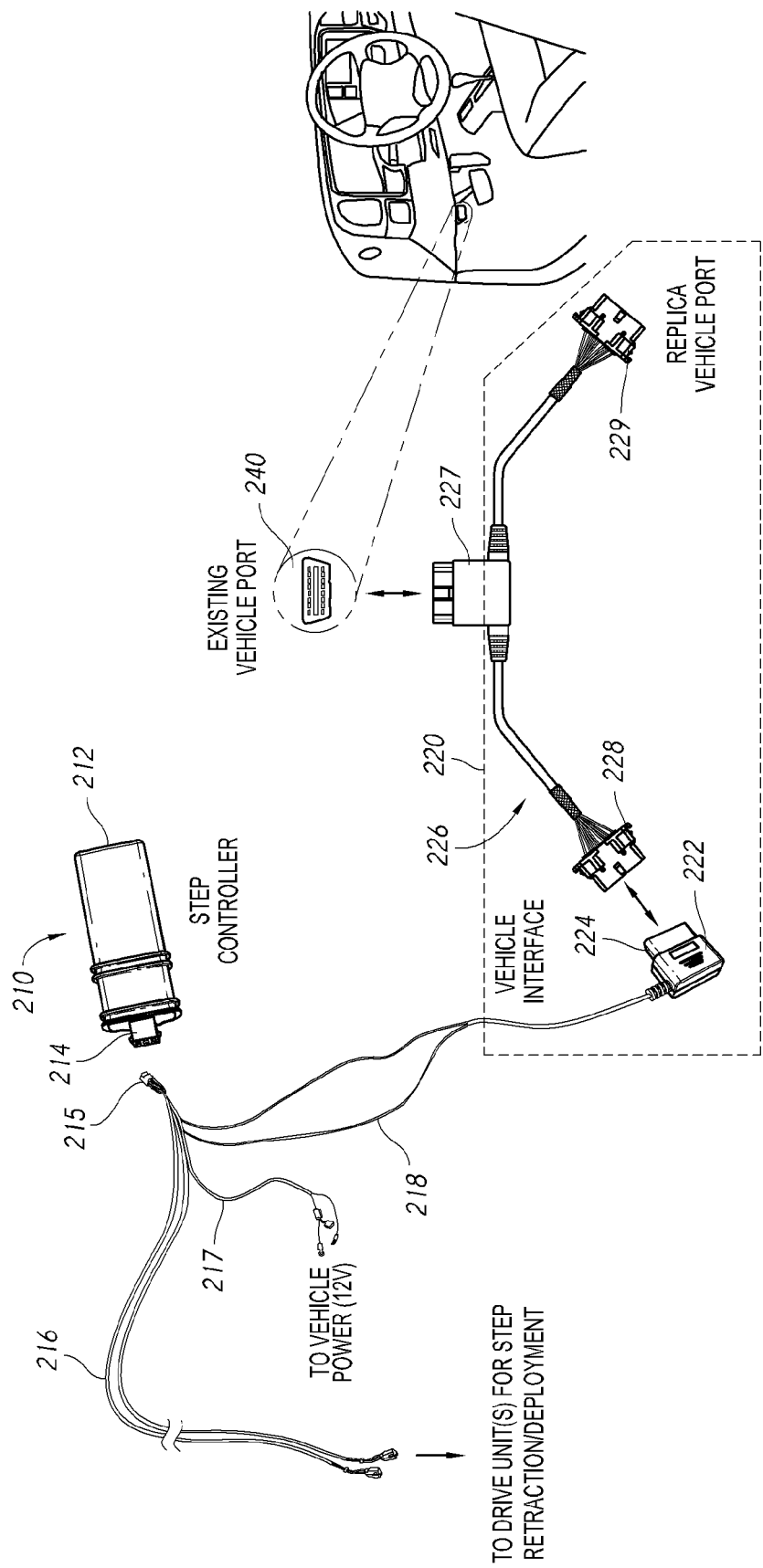
FIG. 2B depicts portions of an automated step system according to another embodiment, where the vehicle interface of the step system includes two replica vehicle ports.

Additional Vehicle Interface Configurations; Port Replication; Override Function In some cases, the vehicle interface 220 is configured to allow normal use of the existing vehicle port 240 functionality while the vehicle interface 220 is plugged into the existing vehicle port 240. For example, FIG. 2B shows an embodiment of a vehicle interface 220 that includes a three-port connector apparatus 226 including a hub connector 227 for interfacing with the existing vehicle port 240, a first replica vehicle port 228 for interfacing with the connector module 222, and a second replica vehicle port 229. The first and second replica vehicle ports 228, 229 can include the same or substantially the same mechanical and electrical connection interface as the existing vehicle port 240.

Moreover, the connector apparatus 226 provides a pass-through function by forwarding or replicating the output of the existing vehicle port 240 at outputs of the first and second replica vehicle ports 228, 229. In this manner, the first replica vehicle port 228 can interface with the connector module 222 for use in operating the automated step system, while the second replica vehicle port 229 provides access to the existing vehicle port 240 functionality for its customary purpose. For instance, where the existing vehicle port 240 is an OBD-II port, automotive technicians can connect OBD-II compliant diagnostic scanners to the second replica vehicle port 229 for diagnostic purposes while the automated step system remains completely intact and installed. In one configuration, the existing vehicle port 240 is physically unfastened from its normal location (while remaining electrically connected as normal), and the second replica vehicle port 229 is fastened in place of the existing vehicle port 240 so that installation of vehicle interface 220 is substantially transparent to technicians and others desiring to use the existing vehicle port 240 while the step system is installed.

FIG. 2D shows an embodiment of a vehicle interface 220 providing only a single replica port 229 which provides standard access to the existing vehicle port 240. Unlike the embodiment of FIG. 2B, the connector module 222 itself includes the replica port 229, and an intermediate component such as the connection apparatus 226 of FIG. 2B is not used to provide port replication. The replica vehicle port 229 is provided on the housing of the connector module 222 in FIG. 2D, providing a compact design. In another embodiment, the replica vehicle port 229 can be provided on a separate connector that attaches to the housing of the connector module 222 via cabling.

Figure 2F:
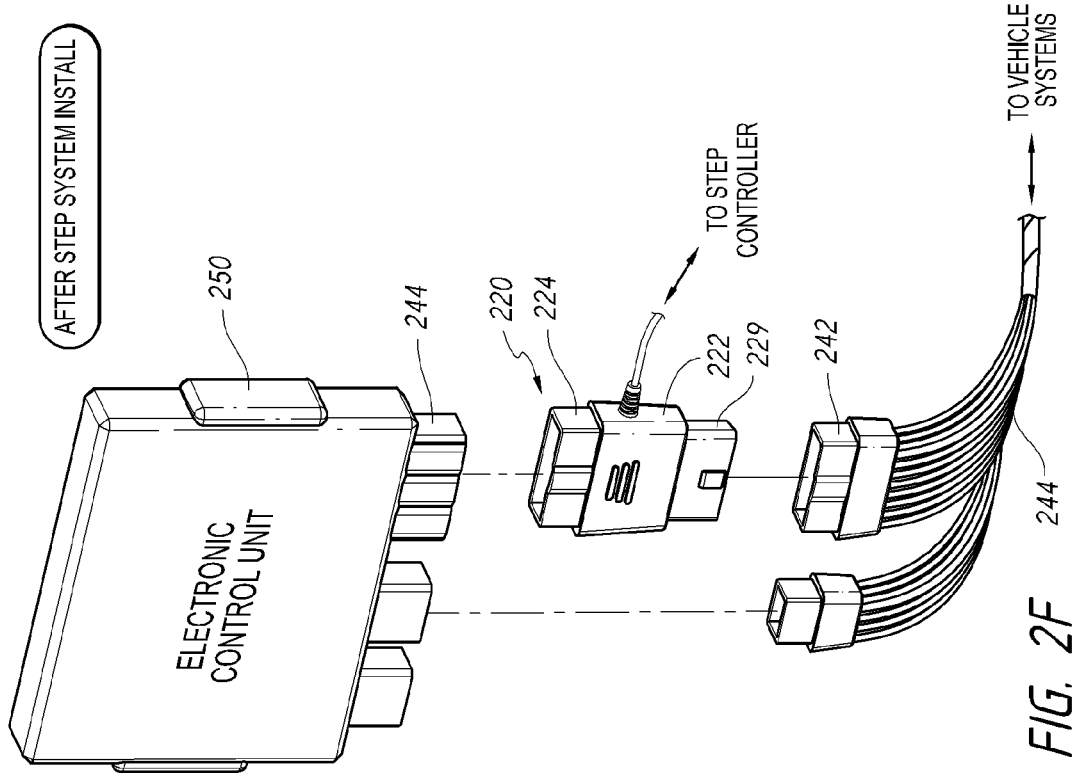
FIG. 2F shows an embodiment of a vehicle interface of an automated step system, after installation, where the vehicle interface is connected to an existing electronic control unit of the vehicle.
Figure 2E:
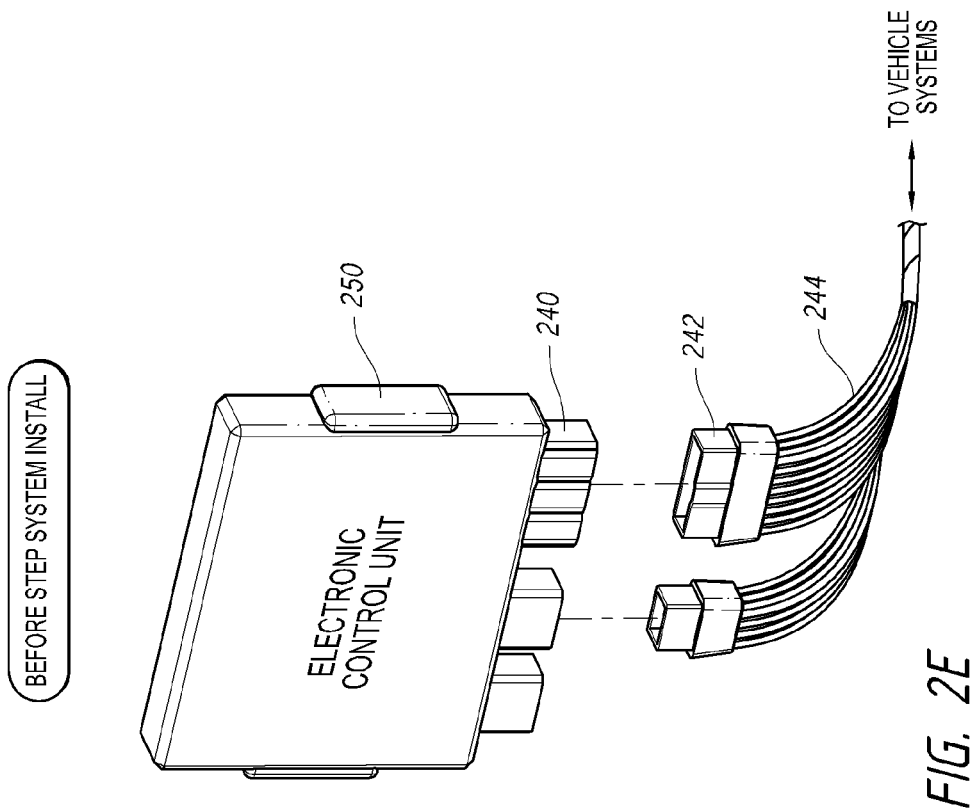
FIG. 2E shows an exemplary connection configuration of an electronic control unit of a vehicle prior to installation of an automated step system.

As depicted in FIGS. 2C (prior to step system installation) and FIG. 2D (post-step system installation), the vehicle interface 220 in some cases can be interposed between the existing vehicle port 240 and another connector 242. The connector 242 is configured to interface with the existing vehicle port 240, and in some embodiments is a connector of a device that is external to the vehicle, such as an OBD diagnostic scanner where the port is an OBD port. In other cases, the connector 242 comprises an existing vehicle connector that normally occupies the existing vehicle port 240. FIGS. 2E and 2F illustrate one such configuration, where the existing vehicle port 240 is a port of a computer system or subsystem 250 of the vehicle 230. The computer system 250 can be an electronic control module (ECU) of the vehicle 230, for example, which is generally an embedded electronics system that controls and/or monitors one or more of the electrical subsystems in the vehicle 230.

Referring to FIG. 2E, the connector 242 terminates cabling 244, and ordinarily occupies the existing vehicle port 240 of the computer system 250 during normal vehicle operation. The connector 242 and cabling 244 carry information between the computer system 250 and appropriate vehicle componentry. For instance, the computer system 250 of some embodiments including the illustrated embodiment can be a body control module (BCM) configured to control door locks, power windows, interior lighting, and the like. The cabling 244 carries information between the BCM and various subsystems of the vehicle which are regulated or monitored by the BCM, such as the doors (e.g., door locks, door handles, door open/closed sensors), windows, interior lighting, power seats, air conditioning, anti-theft system, gauges, and other appropriate vehicle components. Other types of ECU's and other computing systems that can be used in conjunction with the step assist are described herein, e.g., with respect to FIG. 3.

As represented in FIG. 2F, following installation of the automated step system the vehicle interface 220 is interposed between the vehicle computer system 250 and the connector 242. The pass-through function of the vehicle interface 220 enables normal communication between the computer system 250 and the connector 242, thereby making installation of the step system substantially transparent with respect to operation of the computer system 250.

Figure 2G:
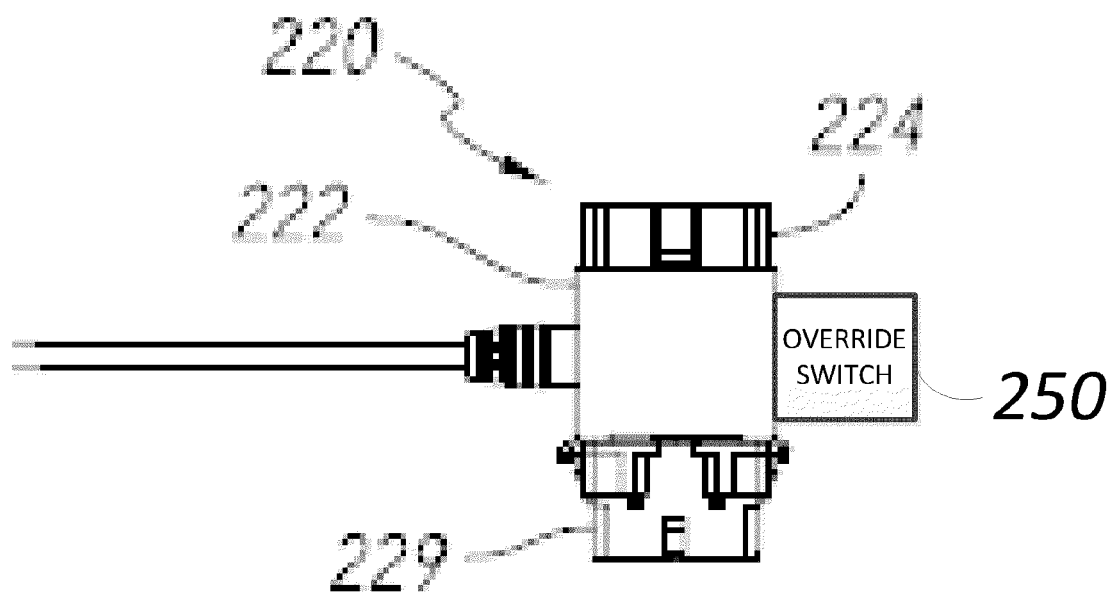
FIG. 2G shows an embodiment of a vehicle interface including an override switch.

FIG. 2G shows an embodiment of a vehicle interface 220 including an override switch 251 that provides such functionality. While automated deployment based on door opening and closing (or other appropriate inputs) is useful in many situations, it can be desirable to allow the vehicle operator to manually control powered step retraction and deployment in certain cases. For instance, the stepping deck often becomes soiled given its proximity to the ground, wheels, and exposure to foot traffic. Thus, it can be desirable to wash the stepping deck. However, it is generally impractical to wash a vehicle having an open door, and it can therefore be desirable to allow for deployment while the doors are closed. As another example, sometimes obstacles (e.g., rocks in off-road environments) are positioned in the step deployment path, such that deployment could cause cosmetic or other damage to the step. Users may nonetheless want to open the door to exit the vehicle. In this and other scenarios it can therefore be useful to provide an override mode that keeps the step in a retracted position even when the door is opened.

While the term "manual" is used with respect to the override mode, this refers to the fact that the user is directly controlling step movement using the switch 251 rather than relying on an automated algorithm. It does not imply that the user physically manipulates the step. Rather, the override mode still preferably involves powered movement of the step in response to actuation of the switch 251.

A variety of different types of switches are possible which can generally include a combination of appropriate mechanical and electrical components which function together to provide the desired override functionality. In one illustrative example, the override switch 251 is a 3-state toggle switch movable between a first, center position in which the step moves according to the normal automated scheme (e.g., in response to detected door openings and closings). Toggling the switch 251 in a first direction away from the center position to a second position initiates a manual retract mode which overrides the normal automated step movement scheme. If the step is deployed at the time the switch 251 is moved to the second position, the step moves to the retracted position, e.g., regardless of the state of the door or of other control inputs. If the step was already in a retracted position, toggling the switch 251 to the second position will not move the step. However, in some embodiments the step will remain retracted even if a door is subsequently opened, so long as the switch 251 remains in the second position. Toggling the step in a second direction away from the center position to a third position initiates a manual deploy mode which overrides the normal automated step movement scheme. If the step is retracted at the time the user moves the switch 251 to the third position, the step deploys, e.g., regardless of the state of the door or of other control inputs. If the step was already deployed, toggling the switch 251 to the third position will not move the step. However, in some embodiments the step will remain deployed even if a door is subsequently closed, so long as the switch 251 remains in the third position. In some embodiments, the switch 251 does not remain in the second or third positions, but instead returns to the center position after the user lets go of the switch 251. In such cases, the step will retract or deploy as appropriate when the switch 251 is moved to the second or third positions, but normal automated deployment will resume once the switch returns to the center position, and subsequent door openings and closings will cause retraction/deployment accordingly. A variety of other types of switches 251 or other user input devices can be provided to engage the override function, including one or more buttons, a touch screen, remote control, or the like. In an alternative embodiment, initiation of an override mode allows the user to physically retract and deploy the step as desired, instead of relying on powered movement.

Moreover, the override switch 251 can be positioned in a location that is accessible to the vehicle operator, e.g., when seated in the driver's seat. For example, referring to FIG. 2B and 2G, inclusion of the override switch 251 on the connector module 222 of the vehicle interface 220 can be convenient in cases where the existing vehicle port 240 is positioned in a manner similar to FIG. 2B. For instance, a user could desirably reach down while seated to actuate the switch 251. While the illustrated switch 251 is included on the connector module 222, the switch 251 can be positioned on another component of the step system, such as the stepping deck, linkage, or drive unit. Or the switch 251 can be provided with a separate housing and be connected to the controller 210 via a wired or wireless connection, facilitating positioning of the switch 251 at any convenient location within the interior or on the exterior of the vehicle.

Exemplary Installed Automated Step System

Figure 3:
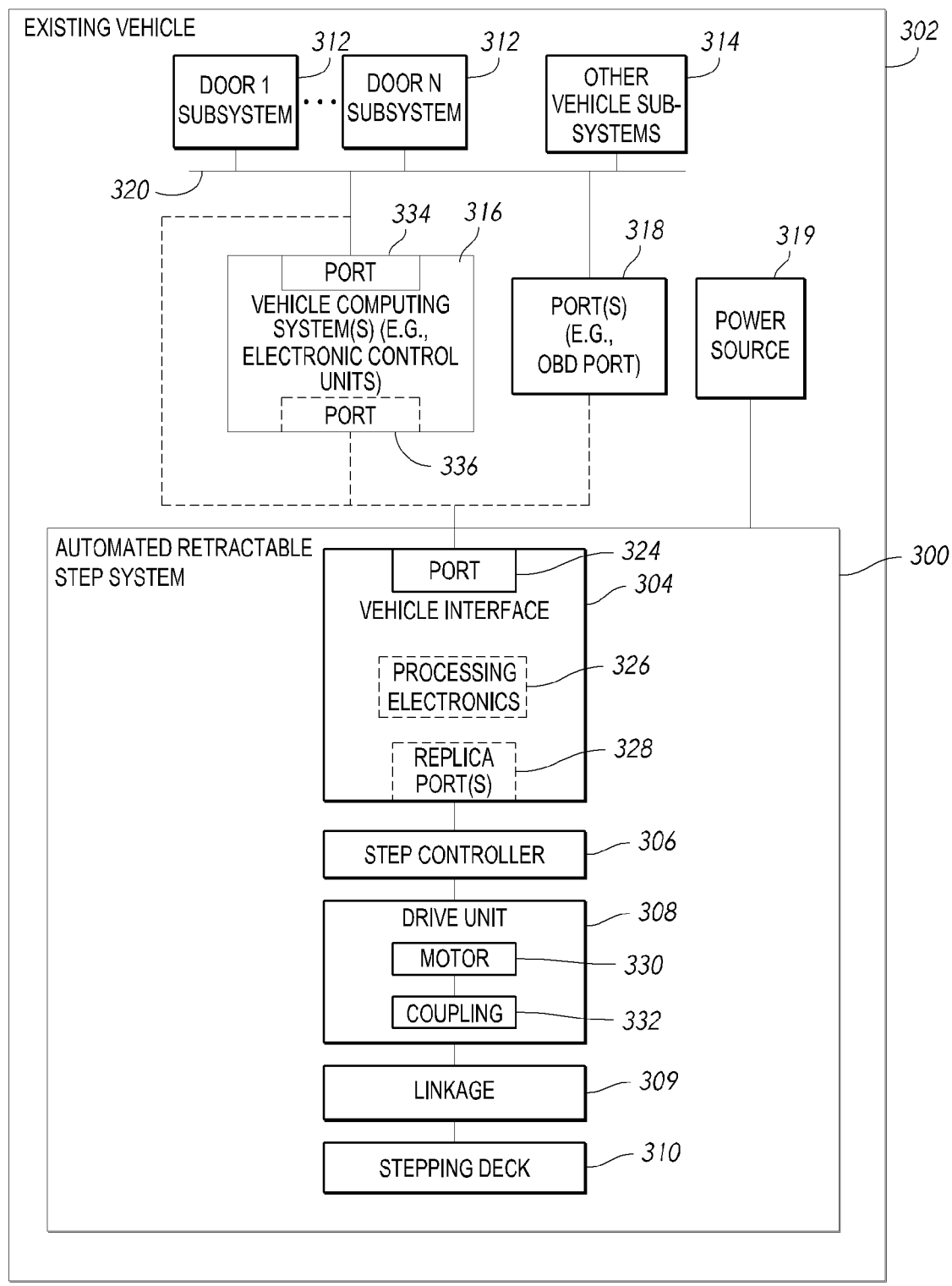
FIG. 3 is a block diagram illustrating an exemplary automated step system in the context of a host vehicle system.

FIG. 3 is a schematic diagram depicting an exemplary automated step system 300 installed in an existing vehicle 302. The automated step system 300 may be installed after market, for example, and can include a vehicle interface 304, a step controller 306, a drive unit 308, linkage 309, and a stepping deck 310.

The existing vehicle 302 can include one or more door subsystems 312 corresponding to one or more doors of the vehicle 302 (e.g., 2, 4 or more doors depending on the vehicle), a plurality of other vehicle subsystems 314, one or more vehicle computing systems 316 having at least one existing vehicle port 334, one or more stand-alone existing vehicle ports 318, and a power source 319. As shown, the various components can be in communication with one another via one or more vehicle communication buses 320. The automated step system 300 of FIG. 3 and corresponding components may be the same or similar to any of the automated step systems and corresponding components described herein, such as any of those described with respect to FIGS. 1A-1B, 2A-2F, and 4, for example.

As shown, the components of the vehicle 302 are connected via at least one communication bus 320. The bus 320 can implement one or a plurality of appropriate bus types, which can include, without limitation, a controller area network (CAN) bus (e.g., a CAN 2.0 compliant bus), a Domestic Digital Bus (D2B), a FlexRay bus, and a Local Interconnect Network (LIN). Taken together, the bus 320 and the components attached to the bus 320 may be referred to as a Local Area Network (LAN) or Vehicle Area Network (VAN). In one embodiment, vehicle interface 304 is a J1962 compliant OBD port that provides open-collector outputs to the controller 306 indicating the state of the driver and passenger side doors based on messages received from the vehicle's controller area network (CAN) bus 320.

Each door subsystem 312 can include existing vehicle electronics configured to control operation of the corresponding vehicle door(s). The door subsystem 312 can also be configured to generate and/or process signals related to operational status of the door, and provide such information to the bus 320. For example, in some embodiments including the illustrated embodiment the door subsystem 312 can be an electronic module (e.g., a car door module) residing with the corresponding door. The electronic module can include appropriate electrical componentry (e.g., one or more microcontrollers, circuitry, and corresponding software or firmware) for controlling some or all of the car door functions, such as window lift, latching/locking operations, wing mirror movement, etc. In one embodiment, the door subsystem 312 is an AN2334 Complete Car Door Module provided by ST Microelectronics. The door subsystem 312 in some embodiments communicates with one or more other components of the vehicle over a LIN bus.

The door subsystem 312 generally operates together with mechanical components of the door to generate door status information. For instance, the doors of the vehicle 302 can generally include a mechanical latch operably coupled to interior and exterior door handles. The latch is a spring-activated latch coupled to the handles via a latch release cable, for example. When the door is closed and the handles are in their relaxed position, the latch mates with a corresponding catch on the door frame, securing the car door shut. When the handle is actuated by the passenger, the latch releases the catch, allowing the car door to open. The door subsystem 312 can include an electrical trigger switch and other appropriate electronics responsive to an actuation, position, or state of the handle, the latch, or both, or that is otherwise responsive to the interaction between the handle and the latch to generate a signal indicating whether the door is open or closed. Depending on the type of vehicle 302, the door subsystem 312 in some alternative embodiments can include existing, pre-installed sensor componentry such as one or more magnets, proximity sensors, or the like. In such cases, one part of the proximity sensor (e.g., a magnetic proximity sensor) may be positioned on the door, and the other part may be positioned on the door frame, such that opening and closing the door is usable to detect door opening and closing due to the resulting change in proximity of the two parts of the sensor. The door subsystem 312 provides a "door ajar" signal to the bus 320 in some embodiments.

The vehicle 302 can include a variety of other existing vehicle systems 314, which, like the door subsystem(s) 312, generally include electronic componentry associated with different parts of the vehicle 302. Similar to a car door module, the other vehicle systems 314 can include integrated electronic modules including collections of components for controlling corresponding vehicle subsystems. Or the other vehicle systems 314 can comprise discrete componentry such as, without limitation, one or more seat occupancy sensors (e.g., pressure sensors), interior lighting control electronics, transmission componentry, ignition componentry, etc. As with the door subsystems 312, some or all of these other vehicle systems 314 may provide information to the bus 320 which is ultimately usable by the step system in determining whether to move the stepping deck 310. For instance, such information is received via the bus 320 by an appropriate vehicle computing system 316 or vehicle port 318, and then made available to the automated step system 300 via the vehicle interface 304.

The vehicle computing systems 316 can generally comprise any vehicle related computer system or subsystem. In particular, the vehicle computer systems 316 can include any type of vehicle ECU or other module that provides information sufficient to determine when it is appropriate to move or otherwise control the stepping deck 310. Examples include a central control module (CCM), general or generic electronic module (GEM), door control unit (DCU), engine control unit (ECU), seat control unit (SCU), and transmission control unit (TCU), speed control unit (SPU) without limitation.

The vehicle computing system 316 includes at least one first port 334 which is normally occupied during vehicle operation by a connector providing a connection to the bus 320. The vehicle computing system 316 can also include at least one second port 336 that is normally unoccupied and provides electronic access to the computing system 316 for diagnostic or other purposes without disconnection from the bus 320.

The vehicle port(s) 318 can include any of the OBD ports described herein or some other type of appropriate existing port of the vehicle 302. For example, the vehicle port(s) 318 can include stand-alone ports that are not integrated with an ECU or other vehicle computing system 316. In some cases, the vehicle port 318 receives status information from a plurality of components including one or more of the vehicle computing system(s) 316, door subsystem(s) 312, and other vehicle systems 314, and presents the information on its output. For instance, where the port 318 is an OBD-II port, it can receive diagnostic and/or other information from some or all of the vehicle ECUs and/or other electronics connected to the bus 320.

As shown, the vehicle interface 304 of the step system 300 includes a port 324 adapted to connect with existing vehicle ports such as the first port(s) 334 of the vehicle computing system 316 (e.g., similar to the embodiment shown in FIG. 2F), the second port(s) 336 of the vehicle computing system 316, or to the existing port(s) 318 (e.g., similar to the embodiments shown in FIGS. 2A and 2B). As discussed previously, the vehicle interface 304 can further include processing electronics 326 for processing data received from the vehicle 302 via the port 324 (e.g., door status information) and/or one or more replica ports 328 providing functional access to the existing vehicle ports that occupied by the vehicle interface 304.

Operation of the vehicle interface 304 according to an illustrative embodiment will now be described, as may be executed by a software or firmware algorithm executing on one or more microcontrollers or other hardware processors of the vehicle interface 304, for example. The vehicle interface 304 first enters an initialization or configuration mode when the vehicle interface is plugged into or otherwise attached to the vehicle port 318 (or other interface on the vehicle 302). The vehicle interface 304 may also enter the configuration mode when the vehicle battery or other power source 319 is connected or reconnected to the step system 300. In the initialization mode, the vehicle interface runs an initialization or boot procedure and then can wait a predetermined period of time while listening to the vehicle bus 320, which is a can bus in the example embodiment. If no configuration messages are received, the vehicle interface 304 enters a run mode. The outputs of the vehicle interface 304 (e.g., open collector outputs) to the controller module 306 are inactive in the initialization mode, for example. In one embodiment, the vehicle interface comprises a separate output for each step, e.g., one output for each of a driver and passenger side running board.

Upon entry to run mode, the state of doors as represented on the outputs of the vehicle interface 304 is "closed". Messages on the CAN or other vehicle bus 320 are checked against one or more internal filters to detect state changes of any of the doors. If any of the doors are open when the vehicle interface 304 enters the run mode, the door should be closed in the example embodiment in order for the vehicle interface 304 to initialize properly and know its state.

For a two door vehicle, the logic of the vehicle interface 304 in the example embodiment is as follows: if the driver door is open, the appropriate output of the vehicle interface 304 to the controller 306 is active; if the passenger door is open, the appropriate output of the vehicle interface to the controller 306 is similarly active. For a four door vehicle according to the example, if either of the front or rear door is open on the driver or passenger side, the corresponding output of the vehicle interface 304 is active. Conversely, if both the front and rear door is closed on the driver or passenger side, the corresponding output is inactive.

If an output is activated during run mode, it can be checked for over-current or other error conditions, and if such conditions exists, the output may be deactivated immediately or soon thereafter, e.g., until the next CAN message on the bus indicates that the output should be activated. This procedure can repeats each time the output activated. When there are no further CAN or other bus messages to process, e.g., after a threshold period of time expires (e.g., between 30-60 seconds after a key-off or other detected action), the vehicle interface 304 can enter a relatively lower power idle mode.

In the idle mode, the vehicle interface 304 can place some most of the processor resources of the vehicle interface 304 in a standby or other low power condition. In the example embodiment, the only three resources that remain active are a CAN interface module of the vehicle interface 304, a timer module, and a power supply monitor, or at least these three modules can remain active. If the CAN module receives a vehicle message in idle mode, the vehicle interface can return to run mode to process it. Otherwise, the vehicle interface 304 can check the vehicle battery voltage periodically (e.g., every 1 or more seconds). If the voltage drops below a threshold amount (e.g., less than two thirds of the normal power supply voltage such as 8 volts for a 12 volt battery), and/or no CAN message is received for a threshold period of time (e.g., at least 5 minutes), the vehicle interface 304 can enter a sleep mode.

In sleep mode, the vehicle interface places the CAN interface (e.g., a CAN transceiver) in a special sleep mode and then completely or substantially completely shuts down the microcontroller(s) of the vehicle interface 304. When awakened, the microcontrollers can enter a run mode.

The step controller 306 is communication with the vehicle interface 304 and can generally include hardware (e.g., one or more microcontrollers, memory, and circuitry) and/or software configured to control operation of the automated step system 300. For instance, the controller 306 processes control inputs received from the vehicle interface 304 and sends appropriate control signals to the drive unit 308. In some embodiments one or more processors of the controller 306 execute an algorithm for determining when to move the stepping deck 310, based on the received control inputs. The algorithm can in some cases be updated after purchase, which can be helpful to maintain compatibility of the step system 300 with a wide variety of vehicles such as newly released vehicles which may implement updated communication protocols (e.g., updated OBD protocols) or other technological developments.

The automated step system 300 can include an interpretation module which may include software, firmware, and/or associated electronics (e.g., one or more microcontrollers or other processors) configured interpret or otherwise process the information received from the vehicle into a format that is usable by the step system for determining when to move the step. For instance, the interpretation module may processes serial data received via an OBD port, a port of a BCM, or some other existing electronics port 240 in a manner that makes the information usable by the step system. Depending on the embodiment, the interpretation module may be implemented in the controller 306, the vehicle interface 304, a combination thereof, or in some other component of the step system 300. In one embodiment, interpretation module is provided by Cubic Systems, Inc., of Ann Arbor Mich.

It is to be understood from the disclosure that a variety of different types of information can be used by the step system 300 to control step movement. Moreover, the information can originate from a variety of different existing vehicle sources and be delivered to the vehicle interface 304 of the step system 300 via different intermediary components (e.g., one or more ECU's and/or an OBD port). The following table provides a non-exhaustive list of some embodiments. A further description of various types of components and associated information and decisioning schemes that can be used is provided with respect to FIG. 6.

The drive unit 308 can include a motor 330 drivingly connected to a coupling 332, which can include a torque limiter and/or appropriate gear system, for example. The motor 330 responds to the control signals received from the step controller 306 to act through the coupling 332 to cause the linkage 309 to move, thereby effectuating movement of the stepping deck 310 to the extended or retracted position, as desired. The linkage 309 can include support arms and/or other appropriate componentry connecting the stepping deck 310 to the drive unit 308. A detailed example of portions one compatible step assist including an exemplary drive unit, linkage, and stepping deck is provided below with respect to FIG. 4.

As shown, power can be provided to the step system 300 from a vehicle battery or other existing power source 319. For instance, the controller 306 may connect to the vehicle power source 319 and deliver power to the drive unit 308, vehicle interface 304, and other appropriate components of the step system 300, similar to the manner described with respect to the embodiments of FIG. 2.

Depending on the embodiment, the physical arrangement of the step system 300 components can vary. For instance, while the step controller 306 can be housed in a separate housing, in some other implementations it is included in a common housing with the drive unit 308 or the vehicle interface 304, or portions thereof.

Exemplary Step Assist

FIG. 4 depicts another embodiment of a retractable vehicle step system 400. The terms "forward," "front" and "outboard" are used interchangeably herein, as are the terms "rearward," "rear" and "inboard," when describing components of the step structures disclosed herein. These terms are to be understood with reference to a direction of ingress into a vehicle, "forward"/"front"/"outboard" meaning generally toward the exterior of the vehicle, and "rearward"/"rear"/"inboard" meaning generally toward the interior of the vehicle. The depicted retractable vehicle step system 400 generally comprises a powered step mechanism 420 and an idler step mechanism 440, both of which are connected to a stepping deck 460. Under power delivered by a drive system 480 drivingly connected to the powered step mechanism 420, the powered and idler mechanisms 420, 440 move the stepping deck 460 between a retracted position (e.g., similar to the retracted position shown in FIG. 1A) and the deployed position depicted in FIG. 4. The deployed position is located downward and outboard of the retracted position.

In other embodiments, two powered step mechanisms 420 may be employed in place of the combination of powered and idler mechanisms 420, 440 depicted in FIG. 4, or only a single powered step mechanism 420 (and no idler mechanism 440 at all) may be employed to support and move the stepping deck 460. In still other embodiments, two or more idler mechanisms 440 may be employed in combination with one or more powered mechanisms 420 to support and move the stepping deck 460.

Each of the powered step mechanism 420 and idler step mechanism 440 comprises a four-bar linkage. Thus, the powered step mechanism 420 includes a first arm 422 and a second arm 424, each of which is pivotably connected to a generally rigid frame 426. The frame 426 is configured to be secured to a vehicle (not shown), particularly the underside thereof, via a mounting flange 428. The first and second arms 422, 424 are therefore pivotable with respect to frame 426 about generally parallel first and second axes A-A, B-B, respectively. When the retractable vehicle step system 400 is mounted on a vehicle, each of the first and second axes A-A, B-B is oriented generally parallel to the ground. A support bracket 430 is rigidly connected to the stepping deck 460, and is connected to the first and second arms 422, 424 so as to be rotatable about third and fourth axes C-C, D-D, respectively. Thus, upon rotation of the first and second arms 422, 424 about the first and second axes A-A, B-B, the stepping deck 460 moves between the retracted position and the deployed position.

Similarly, the idler step mechanism 440 includes a first arm 442 and a second arm 444, each of which is pivotably connected to a generally rigid frame 446. The frame 446 is configured to be secured to the vehicle alongside the powered frame 446 via a mounting flange 448. The first and second arms 442, 444 are therefore pivotable with respect to the frame 446 about the first and second axes A-A, B-B, respectively. A support bracket 450 is rigidly connected to the stepping deck 460, and is connected to the first and second arms 442, 444 so as to be rotatable about the third and fourth axes C-C, D-D, respectively. Thus, upon rotation of the first and second arms 422, 424, 442, 444 about the first and second axes A-A, B-B, the stepping deck 460 moves between the retracted position and the deployed position.

Either of the powered step mechanism 420 or the idler step mechanism 440 may comprise any suitable retractable vehicle step mechanism, of which there are many presently known in the relevant arts. Of course, any suitable later-developed mechanism may also be employed as either of the powered and idler mechanisms 420, 440. In some embodiments, either of the powered and idler mechanisms 420, 440 may comprise any of the retractable-step mechanisms disclosed in U.S. Pat. No. 6,641,158, titled Retractable Vehicle Step, issued Nov. 4, 2003; or U.S. Pat. No. 6,834,875 titled Retractable Vehicle Step, issued Dec. 28, 2004. The entire contents of each of the above-mentioned patents are hereby incorporated by reference herein and made a part of this specification.

Exemplary Step System Installation

Figure 5:
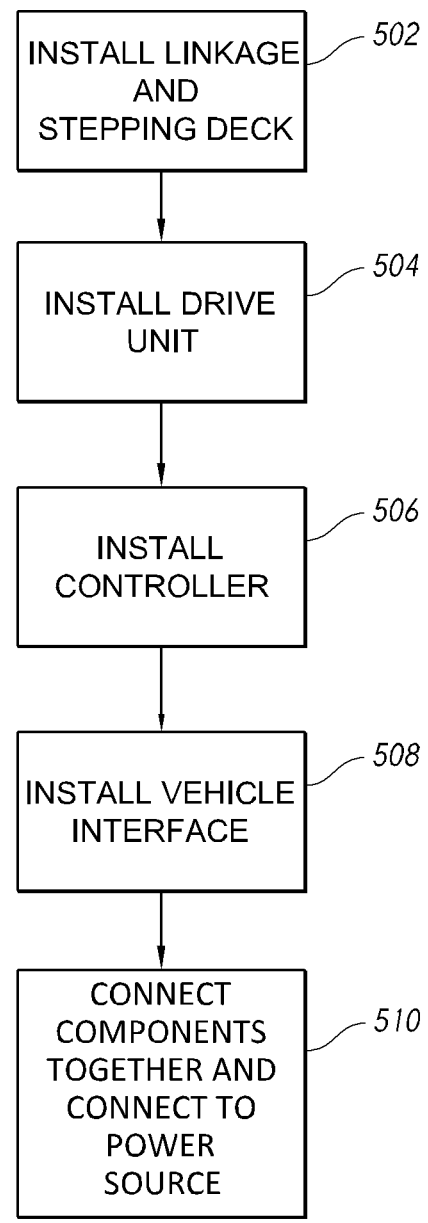
FIG. 5 is a flowchart depicting an exemplary method of installing an automated vehicle step of embodiments described herein.

FIG. 5 is a flowchart depicting an exemplary method of installing an automated vehicle step system. The method may be used to install an automated step system to a host vehicle after market by the owner of the vehicle, for example, or by any other appropriate individual. The installed step system can be any of the step systems described herein.

At step 502, the method includes installing the linkage and stepping deck of the step system. The linkage and stepping deck may be similar to the embodiments of FIGS. 1A-1B, 3, and 4, for example. For instance, referring to the step assist 400 of FIG. 4, the combination of the first arm 422, second arm 424, support frame 426, and mounting flange 428 may correspond to the linkage, while the stepping deck 460 and supporting brackets 430, 450 correspond to the stepping deck.

While the particular steps involved in installing the linkage and stepping deck can vary depending on the particular mechanical design, in one embodiment the operator attaches the linkage to the underside of the vehicle and attaches the stepping deck to the other side of the linkage. Where there are two sets of linkages such as is depicted in FIGS. 1A-1B and FIG. 4, step 502 also involves attaching the second linkage to the vehicle and to the stepping deck, which can be achieved in a manner similar to that used to attach the first linkage.

Installing the linkage in some embodiments involves removal of one or more body mount bolts on the underside of the vehicle and fastening the linkage to the vehicle using the body mount bolts or other appropriate fastening means. Installing the stepping deck can involve fastening the stepping deck to the linkage(s) using one or more fastening bolts or other fastening means. In some cases, the stepping deck is permanently attached to the linkages, and separate installation of the stepping deck is not necessary.

At step 504, the method includes installing the drive unit of the step system. In some embodiments, this involves engaging a coupling of the motor of the drive unit with a corresponding coupling provided on the linkage. For instance, a gear provided on the motor coupling can be meshed with a corresponding gear on the linkage. Step 504 can also include fastening the motor to the linkage (e.g., using one or more fastening bolts), or directly to the vehicle depending on the design.

Step 506 involves installing the controller, which can be any of the controllers described herein. In some embodiments, the controller housing is positioned under the hood of the vehicle somewhere within the engine compartment. For instance, the controller housing in an embodiment is fastened to a support arm within the engine compartment.

At step 508, the method includes installing the vehicle interface. The vehicle interface can be any of those described herein, including any of the vehicle interfaces 220 described with respect to FIGS. 2A-2F, or the vehicle interface 304 of FIG. 3. In some embodiments, step 508 includes attaching a connector of the vehicle interface to an existing port of the vehicle.

For instance, referring to FIG. 2A, step 508 can include coupling the port 224 of the vehicle interface 220 with the corresponding connector of the OBD or other type of existing vehicle port 240, e.g., via a friction fit or interference fit. Referring to FIG. 2B, step 508 can include attaching the port 227 of the connector apparatus 226 to the existing vehicle port 240, and attaching the port 224 of the connector module 222 to the first replica port 228.

As discussed above, in some embodiments, a replica port of the vehicle interface, such as the second replica port 229 of the embodiment shown in FIG. 2B, can be physically positioned in place of the existing vehicle port 240 to provide normal access to the functionality of the existing vehicle port 240. For instance, still referring to FIG. 2B, the existing vehicle port 240 and its associated housing can be physically detached from its normal location under the dashboard, and repositioned at another location with respect to the vehicle. And the second replica port 229 can be secured at the original location of the existing vehicle port 240, e.g., under the dashboard, using any suitable fastening means such as adhesives, ties, or the like. Meanwhile, the other portions of the vehicle interface 220 including the port 227, the first replica port 228, the connector module 222, and associated cabling can be positioned elsewhere. In one illustrative embodiment, step 508 of the installation method includes fastening these portions to the underside of the dashboard, such that these components are not visible from the passenger's normal line of sight, for example. By positioning the second replica port 229 in place of the existing vehicle port 240, the installation is substantially transparent to technicians or other individuals desiring to access the functionality of the existing vehicle port 240. For instance, where the vehicle port 240 is an OBD port, a technician may plug an OBD scanner into the second replica vehicle port 229 to perform diagnostics without even knowing that he is connecting to a replica port rather than the original vehicle port 240.

A similar approach can be used with respect to the embodiment of the vehicle interface 220 shown in FIG. 2D. For instance, the connector module 222 of the vehicle interface 240 can be fastened or otherwise positioned in place of the existing vehicle port 240, and the replica port 229 can provide users with ready access to the functionality of the existing vehicle port 240. Depending on the embodiment, the replica port 229 may not be positioned at exactly the same position as the existing vehicle port 240. For instance, referring to FIG. 2B again, the existing vehicle port 240 (connected to the port 227 of the vehicle interface 240) may be repositioned, e.g., out of sight, and the second replica port 229 may be positioned at any appropriate location, such as some position on the dashboard or within the footwell such that a user will be able to readily recognize that the replica port 229 can be utilized to access the functionality of the existing vehicle port 240.

Step 508 can in some embodiments include interposing the vehicle interface 220 between an existing electrical junction or other existing connection of the vehicle. For instance, referring to FIGS. 2E-2F, step 508 can involve detaching the connector 242 from the electronic control unit 250, attaching the port 224 of the connector module 222 to the now unoccupied port 244 of the electronic control unit 250, and attaching the replica port 229 of the connector module 222 to the connector 242 of the cabling 244 that was removed from the electronic control unit 250. In this manner, the vehicle interface 240 can be readily installed using existing vehicle connections, without altering normal vehicle operation.

At step 510, the method includes connecting and powering the components of the step system. For instance, referring to FIG. 2A for the purposes of illustration, the controller 210 in one embodiment is installed in proximity to the vehicle battery (step 506) and the wiring 216 is routed from the controller to the drive unit of the step system. For instance, the wiring 216 may be routed through the engine compartment (e.g., at least partly alongside an existing wiring harness) and down through the engine compartment and into the front wheel well on the step-side of the vehicle. The wiring 216 is further routed to the underside of the vehicle and connected to the drive unit. Where more than one step is present, there may be multiple corresponding sets of wiring 216 that are routed in a similar fashion to the respective drive units.

The wiring 218 may be routed from the connector 222 of the vehicle interface 240 to the controller 210. For instance, where the connector 222 is attached to a vehicle port 240 that is positioned in the manner shown in FIG. 2A, the wiring 218 may be routed from the vehicle port 240, into the engine compartment, and then routed within the engine compartment (e.g., at least partly alongside an existing vehicle wiring harness) to the controller 210 and connected to the port 214 of the controller 210.

The wiring 217 may be routed from the controller 210 to the vehicle battery to provide power to the components of the installed step system. While shown as a sequence of separate steps for illustrative purposes, portions of activities described with respect to the individual steps may be performed together, and the steps can be performed in a different order. For instance, although step 510 is shown separately, different portions of the step system may be connected together and/or powered at different points in time during the install.

Exemplary Step System Operation

Figure 6:
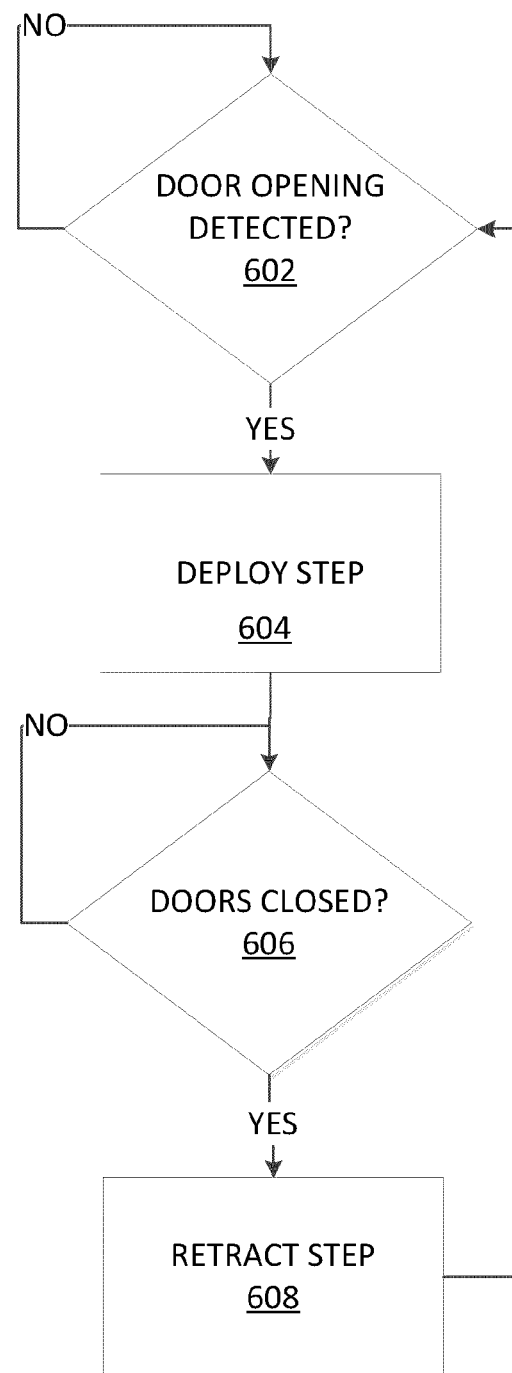
FIG. 6 is a flowchart depicting an exemplary method of operation for an automated vehicle step of embodiments provided herein.

FIG. 6 is a flowchart depicting an exemplary method of operating a step system. The step system can be any of the step systems described herein, for example. The control algorithm may be implemented by software or firmware executing in one or more hardware processors of the vehicle interface of the step system, the controller of the step system, such as the vehicle interfaces 220 or controllers 210 of FIGS. 2A, 2B, and 2D, or the vehicle interface 304 or controller 306 of FIG. 3. For instance, the vehicle interface may provide outputs to the controller that the controller uses to instruct the drive unit, as discussed previously. For the purposes of illustration, certain aspects of the method are described with respect to a running board style step assist such as the ones shown in FIGS. 1A-1B and FIG. 4, which at least partially spans the length of, and is used to assist user entry/exit with respect to, at least front and rear doors. It will be understood, however, that the method can apply to various other step assist configurations.

At decision block 602, the stepping deck is in a retracted position, and the control algorithm specifies that the stepping deck will remain so until a door on the running board-side of the car is opened. When the vehicle interface and/or controller determines that any door on the running board-side of the car has been opened, the controller causes the running board to deploy at step 604.

In another embodiment, there is only one step provided, e.g., under one of the front door or the rear door, and in such a case the stepping deck would deploy only if that particular door was opened. In yet another configuration, separate steps are provided for independent use with each of the front and rear doors, and each step similarly deploys only if the door associated with that particular step is opened.

Returning to the two-door running board example, after detecting the opening of any door on the running board-side of the vehicle, the method enters decision block 606. The control algorithm specifies that the running board will remain deployed unless and until all of the doors on the running-board. Once all of the doors are closed, the method leaves decision block 606, and the step system retracts the stepping deck at step 608. In some cases, the controller implements a delay before retracting the stepping deck at step 608 (e.g., of 1, 2, 3, 4, 5, or more seconds).

Where only one step is provided for use with one door, or where separate stepping decks are provided for use with each of the front and rear door, the stepping deck would retract at step 608 in response to closure of just that particular door, even if the other door remains opened.

After retraction of the stepping deck at step 608, the method returns to decision block 602 and the vehicle interface and/or controller again listens for relevant door openings.

While the method has been described with respect to a step assist(s) installed on one side of the vehicle, one or more step assists can also be implemented on the opposing side of the vehicle, as discussed previously. In such a case, the step assist(s) on the opposing side can operate in a similar manner and in response to the door(s) on the opposing side opening and closing. In an alternative embodiment, a step assist installed on the passenger side deploys/retracts in response to one or more driver side doors opening/closing, or vice versa.

Operation of the stepping assist with respect to the method of FIG. 6 has thus far been described for the purposes of illustration primarily with respect to door opening and closing events. Such events can be detected in any of the manners described herein. It will further be understood that a wide variety of inputs can be used instead of or in addition to door opening and closing events, and that a variety of decisioning schemes can be used to control movement of the stepping deck. The table below provides a simplified description of just a few such examples.

| Exemplary Originating Vehicle Component(s) | Exemplary Intermediary Vehicle Component(s) | Type of Information | Step Movement Decision |
|---|---|---|---|
| Door subsystem(s) (e.g., car door module) | BCM, DCU, OBD port | Door opened/closed information (e.g., door ajar) | door open/ajar = deploy; door closed = retract |
| Door subsystem(s) (e.g., car door module) | BCM, DCU, OBD port | Door locked/unlocked information | door unlocked = deploy; allow deployment door locked = retract; do not allow deployment |
| Transmission system, Engine Computer, Speedometer | TCU, Engine Control Unit, Speed Control Unit | Vehicle speed | speed > threshold (e.g., >5 mph) = retract; do not allow deployment (even if door is open/ajar); speed < threshold (e.g., <5 mph) = allow deployment |
| Vehicle Ignition system | Engine Control Unit, OBD port | Vehicle engine on/vehicle engine off | vehicle off = allow deployment vehicle on = retract; do not allow deployment |
| Key FOB actuation sensor | BCM, DCU | Door locked/unlocked using FOB | door unlocked = deploy; door locked = retract |
| Key FOB proximity sensor | BCM, DCU | Driver approaching vehicle | driver crosses into threshold proximity = deploy; driver crosses out of threshold proximity = retract |
| Transmission system | TCU, OBD port | Transmission status | in park = deploy; allow deployment in gear = retract; do not allow deployment |

The above chart shows a simplified depiction of the step movement decisioning process. It will be appreciated that a variety of combinations of the above or other inputs and decisioning schemes can be used to determine when to move the step. For example, while not specifically illustrated in the flowchart, depending on the embodiment, input from an override switch can be used in combination with door opening and closing information by the decisioning algorithm. For instance. It will be appreciated that the override would supercede the algorithm set forth in the flowchart of FIG. 6. Another illustrative example which involves the use of a combination of vehicle speed information and door opening and closing information will now be described.

As indicated in the above chart, vehicle speed can be used in some cases to control movement of the step. Vehicle speed information can originate from any appropriate vehicle electronics, such as a speedometer, engine computer, a wheel speed sensor or other speed sensor, a transmission system component, or the like. Referring to FIG. 3, speed information can be forwarded directly to an OBD or other vehicle port 318. Or speed information can be sent to a vehicle computing system 316 (e.g., a transmission control unit (TCU), speed control unit (SCU), or engine control unit (ECU)). The vehicle computing system 316 in such cases can provide access to the speed information (e.g., after processing) via one of the ports 334, 336 of the computing system 316, or can instead process the speed information and forward the processed information to an OBD or other stand-alone port 318.

However obtained, the vehicle interface and/or step system controller can utilize the vehicle speed information in concert with door opening and closing information, as desired. As one example, when the vehicle is either not moving, or is moving, but below a threshold speed, the step system retracts and deploys the step in response to door openings and closings as indicated with respect to the flow chart above. However, when a step is deployed at the time the vehicle speed exceeds the threshold speed, the algorithm specifies that the step will retract even if a door is open (e.g., ajar). This can be useful where a door is slightly ajar or otherwise not completely closed, but the driver continues to drive the vehicle because it escapes her notice. The algorithm can additionally specify that while vehicle speed is above the threshold, the step will not deploy, even in response to door openings. The threshold speed can vary, but can preferably be a relatively low value in some cases, and in one embodiment is a value less than 5 mph. According to other embodiments, the threshold is a value less than 1, 2, 10, 15, 20, 25, 30, or 40 mph, or falls within a range of between about 1 mph and about 30 mph, between about 2 mph and about 20 mph, between about 3 mph and about 15 mph, or within some other range. In yet other cases, the threshold value is about 3, 4, 5, 6, 7, 8, 9, 10, 15, or 20 mph.

In another illustrative example, vehicle engine on/off information can be used in combination with door opening and closing information. For example, step deployment may be disabled if the vehicle is running, even if the corresponding door is opened.

Terminology/Additional Embodiments

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

What is claimed is:
1. A powered retractable vehicle step assist system configured for use with a vehicle, the step assist system comprising:
 a stepping member having a stepping surface and movable between a retracted position and a deployed position with respect to the vehicle;
 at least one support member connectable with respect to an underside of the vehicle and connected to the stepping member, the support member configured to at least partially support the stepping member with respect to the vehicle;
 a motor operably coupled to the support member and capable of effectuating movement of the stepping member from the retracted position to the deployed position;
 a vehicle interface configured to connect with an already existing electronics port of the vehicle and to electroni- cally receive data via the existing electronics port, the data generated by existing electronics of the vehicle; and a controller in electronic communication with the motor and configured, in response to the data received from the already existing electronics port, to cause the motor to effectuate movement of the stepping member between the retracted position and the deployed position, wherein the data comprises door opened/closed status information originating from door electronics that do not incorporate any wireless sensors to detect door opened/closed status.

2. The step assist system of claim 1, wherein the vehicle interface implements a serial digital interface and the existing electronics port provides the data to the vehicle interface as serial digital data.

3. The step assist system of claim 1, wherein the existing electronics port includes an on-board diagnostic port.

4. The step assist system of claim 1, wherein the controller commands the motor to effectuate movement of the stepping member between the retracted position and the deployed position in response to determining that a door vehicle has opened.

5. The step assist system of claim 1, wherein the vehicle interface comprises an electrical connector configured to directly attach to the already existing electronics port of the vehicle.

6. The step assist system of claim 5, wherein the electrical connector of the vehicle interface is configured to mate with the already existing electronics port via an interference fit.

7. The step assist system of claim 1, further comprising a wired connection between the vehicle interface and the controller.

8. A powered retractable vehicle step assist system configured for use with a vehicle, the step assist system comprising:

a stepping member having a stepping surface and movable between a retracted position and a deployed position with respect to the vehicle;

at least one support member connectable with respect to an underside of the vehicle and connected to the stepping member, the support member configured to at least partially support the stepping member with respect to the vehicle;

a motor operably coupled to the support member and capable of effectuating movement of the stepping member from the retracted position to the deployed position;

a vehicle interface configured to connect with an already existing electronics port of the vehicle and to electronically receive data via the existing electronics port, the data generated by existing electronics of the vehicle; and a controller in electronic communication with the motor and configured, in response to the data received from the already existing electronics port, to cause the motor to effectuate movement of the stepping member between the retracted position and the deployed position, wherein the existing vehicle electronics include a body control module.

9. The step assist system of claim 8, wherein the vehicle interface implements a serial digital interface and the existing electronics port provides the data to the vehicle interface as serial digital data.

10. The step assist system of claim 8, wherein the existing electronics port includes an on-board diagnostic port.

11. The step assist system of claim 8, wherein the controller commands the motor to effectuate movement of the stepping member between the retracted position and the deployed position in response to determining that a door vehicle has opened.

12. The step assist system of claim 8, wherein the vehicle interface comprises an electrical connector configured to directly attach to the already existing electronics port of the vehicle.

13. The step assist system of claim 8, further comprising a wired connection between the vehicle interface and the controller.

14. A powered retractable vehicle step assist system configured for use with a vehicle, the step assist system comprising:

a stepping member having a stepping surface and movable between a retracted position and a deployed position with respect to the vehicle;

at least one support member connectable with respect to an underside of the vehicle and connected to the stepping member, the support member configured to at least partially support the stepping member with respect to the vehicle;

a motor operably coupled to the support member and capable of effectuating movement of the stepping member from the retracted position to the deployed position;

a vehicle interface configured to connect with an already existing electronics port of the vehicle and to electronically receive data via the existing electronics port, the data generated by existing electronics of the vehicle; and a controller in electronic communication with the motor and configured, in response to the data received from the already existing electronics port, to cause the motor to effectuate movement of the stepping member between the retracted position and the deployed position, wherein the vehicle interface comprises a first connector configured to connect to the existing electronics port and further comprises a replica connector, wherein vehicle interface is configured to forward the data received from the existing electronics port to the replica connector.

15. The step assist system of claim 14, wherein the vehicle interface includes a cable spanning between the first connector and the replica connector.

16. The step assist system of claim 14, wherein the vehicle interface further comprises a second replica connector, the controller being coupled to the vehicle interface via connection to the second replica connector.

17. The step assist system of claim 14, wherein the first connector and the replica connector are provided on a common housing.

18. The step assist system of claim 14, wherein the existing electronics port includes an on-board diagnostic port.

19. The step assist system of claim 14, wherein the controller commands the motor to effectuate movement of the stepping member between the retracted position and the deployed position in response to determining that a door vehicle has opened.

20. The step assist system of claim 14, wherein the vehicle interface comprises an electrical connector configured to directly attach to the already existing electronics port of the vehicle.

21. The step assist system of claim 14, further comprising a wired connection between the vehicle interface and the controller.

22. A method of installing an automated vehicle step assist system to a vehicle, the method comprising:

electrically connecting control electronics of the step assist system to an existing power source of the vehicle;

mounting the control electronics of the step assist on the vehicle;

mounting a step of the step assist system with respect to the vehicle such that a stepping deck of the step is capable of powered movement between retracted and deployed positions;

securing a motor of the step assist system to the vehicle, the motor in electrical communication with the control electronics and drivably coupled to the step to provide the powered movement of the stepping deck; and interfacing with an existing communication bus of the vehicle such that electronic information obtained via the existing communication bus is communicated to the control electronics of the step assist system, wherein the interfacing comprises establishing a wired connection between the existing communication bus and the control electronics of the step assist system.

23. The method of claim 22, wherein the interfacing comprises mating a connector of the step assist system with an existing connector of the vehicle.

24. The method of claim 22, wherein the installation is performed after market.

25. A method of installing an automated vehicle step assist system to a vehicle, the method comprising:

electrically connecting control electronics of the step assist system to an existing power source of the vehicle;

mounting the control electronics of the step assist on the vehicle;

mounting a step of the step assist system with respect to the vehicle such that a stepping deck of the step is capable of powered movement between retracted and deployed positions;

securing a motor of the step assist system to the vehicle, the motor in electrical communication with the control electronics and drivably coupled to the step to provide the powered movement of the stepping deck;

interfacing with an existing communication bus of the vehicle such that electronic information obtained via the existing communication bus is communicated to the control electronics of the step assist system, wherein the interfacing comprises mating a connector of the step assist system with an existing connector of the vehicle; and repositioning the existing connector of the vehicle and fastening a replica port of the step assist system to an accessible location in the vehicle.

26. The method of claim 25, wherein the replica port is positioned in substantially the original location of the existing connector of the vehicle.

27. A method of installing an automated vehicle step assist system to a vehicle, the method comprising:

electrically connecting control electronics of the step assist system to an existing power source of the vehicle;

mounting the control electronics of the step assist on the vehicle;

mounting a step of the step assist system with respect to the vehicle such that a stepping deck of the step is capable of powered movement between retracted and deployed positions;

securing a motor of the step assist system to the vehicle, the motor in electrical communication with the control electronics and drivably coupled to the step to provide the powered movement of the stepping deck; and interfacing with an existing communication bus of the vehicle such that electronic information obtained via the existing communication bus is communicated to the control electronics of the step assist system, wherein the interfacing does not involve disassembly of the vehicle.

* * * * *